(12) United States Patent
Kawai et al.

(10) Patent No.: US 11,054,560 B2
(45) Date of Patent: Jul. 6, 2021

(54) FABRY-PEROT INTERFERENCE FILTER AND LIGHT-DETECTING DEVICE

(71) Applicant: HAMAMATSU PHOTONICS K.K., Hamamatsu (JP)

(72) Inventors: Toshimitsu Kawai, Hamamatsu (JP); Katsumi Shibayama, Hamamatsu (JP); Takashi Kasahara, Hamamatsu (JP); Masaki Hirose, Hamamatsu (JP); Hiroki Oyama, Hamamatsu (JP); Yumi Teramachi, Hamamatsu (JP)

(73) Assignee: HAMAMATSU PHOTONICS K.K, Hamamatsu (JP)

( * ) Notice: Subject to any disclaimer, the term of this patent is extended or adjusted under 35 U.S.C. 154(b) by 30 days.

(21) Appl. No.: 15/633,863

(22) Filed: Jun. 27, 2017

(65) Prior Publication Data

US 2018/0011232 A1   Jan. 11, 2018

(30) Foreign Application Priority Data

Jul. 11, 2016 (JP) ............................. JP2016-136813
Jul. 11, 2016 (JP) ............................. JP2016-136814

(51) Int. Cl.
| | |
|---|---|
| *G02B 5/28* | (2006.01) |
| *G02B 26/00* | (2006.01) |
| *G01J 5/08* | (2006.01) |
| *G01J 5/06* | (2006.01) |
| *G01J 1/04* | (2006.01) |

(Continued)

(52) U.S. Cl.
CPC ............ *G02B 5/285* (2013.01); *G01J 1/0488* (2013.01); *G01J 5/023* (2013.01); *G01J 5/024* (2013.01); *G01J 5/0235* (2013.01); *G01J 5/041* (2013.01); *G01J 5/045* (2013.01); *G01J 5/06* (2013.01);

(Continued)

(58) Field of Classification Search
CPC ...... G02B 5/285; G02B 5/288; G02B 26/001;
G01J 5/0235; G01J 5/06; G01J 5/024;
G01J 5/023; G01J 5/0862; G01J 5/045;
G01J 5/041; G01J 1/0488
See application file for complete search history.

(56) References Cited

U.S. PATENT DOCUMENTS 10,185,140 B2 *   1/2019   Shibayama ............... G01J 3/26
2005/0167597 A1   8/2005   Yokura et al.
(Continued)

FOREIGN PATENT DOCUMENTS

| CN | 105339829 A | 2/2016 |
|---|---|---|
| CN | 105683726 A | 6/2016 |

(Continued)

*Primary Examiner* — Jennifer D Bennett
(74) *Attorney, Agent, or Firm* — Faegre Drinker Biddle & Reath LLP

(57) ABSTRACT

A Fabry-Perot interference filter includes: a substrate having a first surface and a second surface facing each other; a first layer structure disposed on the first surface; and a second layer structure disposed on the second surface, wherein the first layer structure is provided with a first mirror portion and a second mirror portion facing each other with an air gap therebetween, and a distance between the first mirror portion and the second mirror portion is varied, and the second layer structure is formed with a separation region separating at least a part of the second layer structure into one side and another side in a direction along the second surface.

15 Claims, 16 Drawing Sheets

(51) Int. Cl.
*G01J 5/02* (2006.01)
*G01J 5/04* (2006.01)
(52) U.S. Cl.
CPC ............ *G01J 5/0862* (2013.01); *G02B 5/288* (2013.01); *G02B 26/001* (2013.01)

(56) References Cited

U.S. PATENT DOCUMENTS

2007/0171531 A1* 7/2007 Nakamura ........... G02B 26/001
359/580
2011/0128549 A1* 6/2011 Nishimura ................ G01J 3/26
356/450
2016/0370573 A1* 12/2016 Shibayama .......... G02B 26/001

FOREIGN PATENT DOCUMENTS

| | | | |
|---|---|---|---|
| JP | 2001-338932 | A | 12/2001 |
| JP | 2002-026069 | A | 1/2002 |
| JP | 2011-112999 | A | 6/2011 |
| JP | 2013-222169 | A | 10/2013 |
| JP | 2013-257561 | A | 12/2013 |
| JP | 2015-011311 | A | 1/2015 |
| JP | 2015-011312 | A | 1/2015 |
| WO | WO 03/052506 | A1 | 6/2003 |
| WO | WO-2015002021 | A1 * | 1/2015 ................ G01J 3/26 |

\* cited by examiner

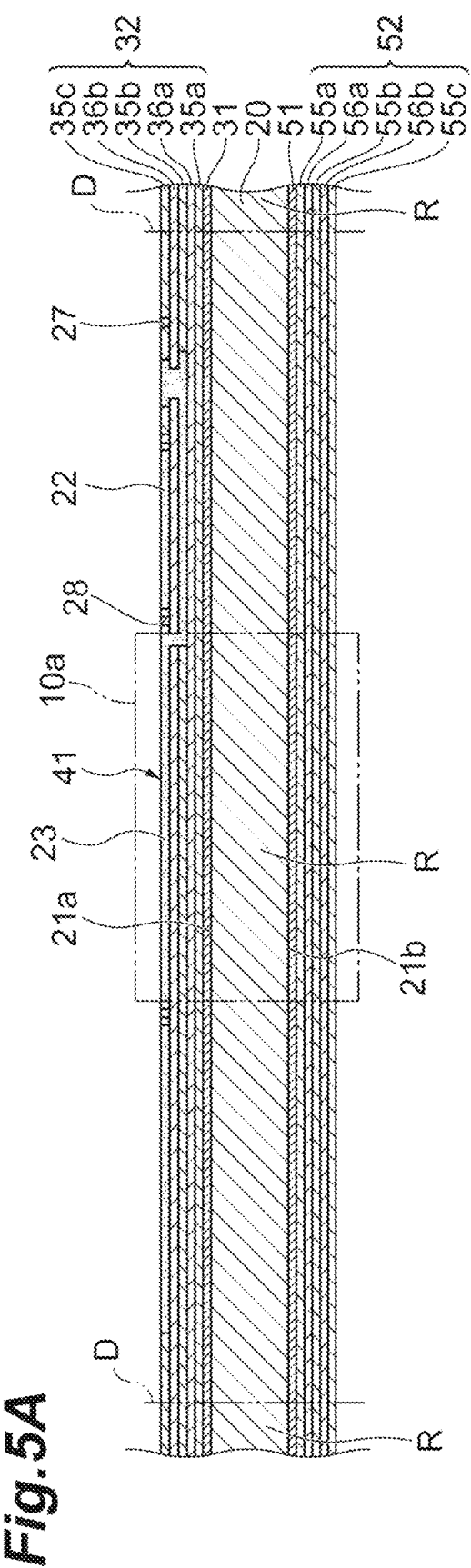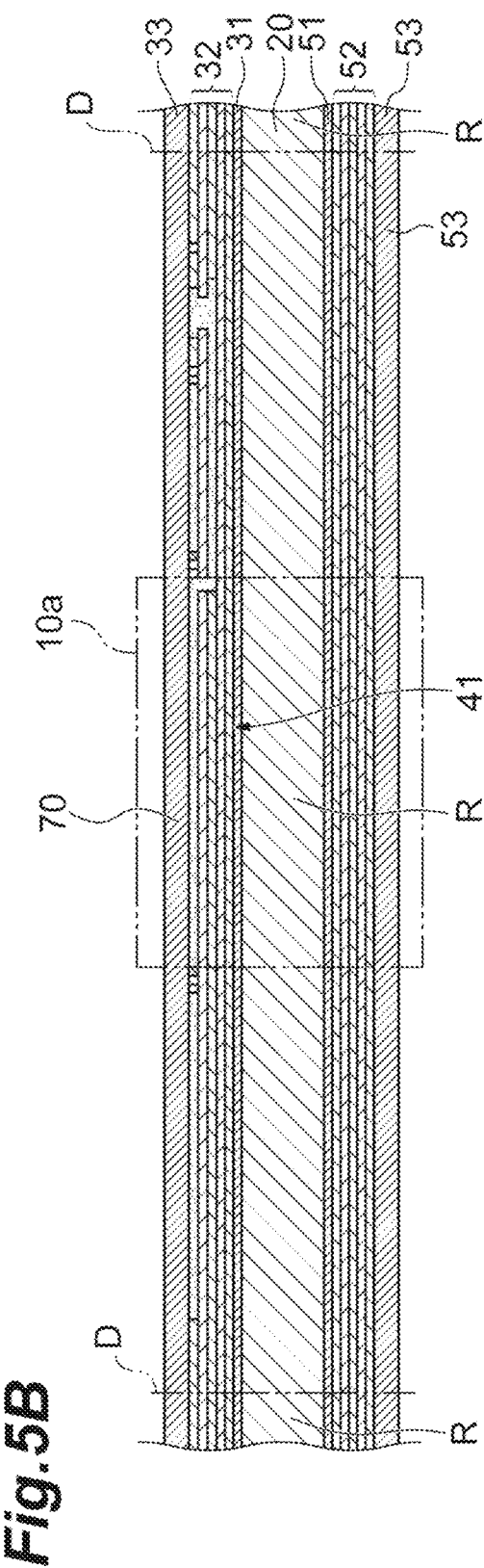

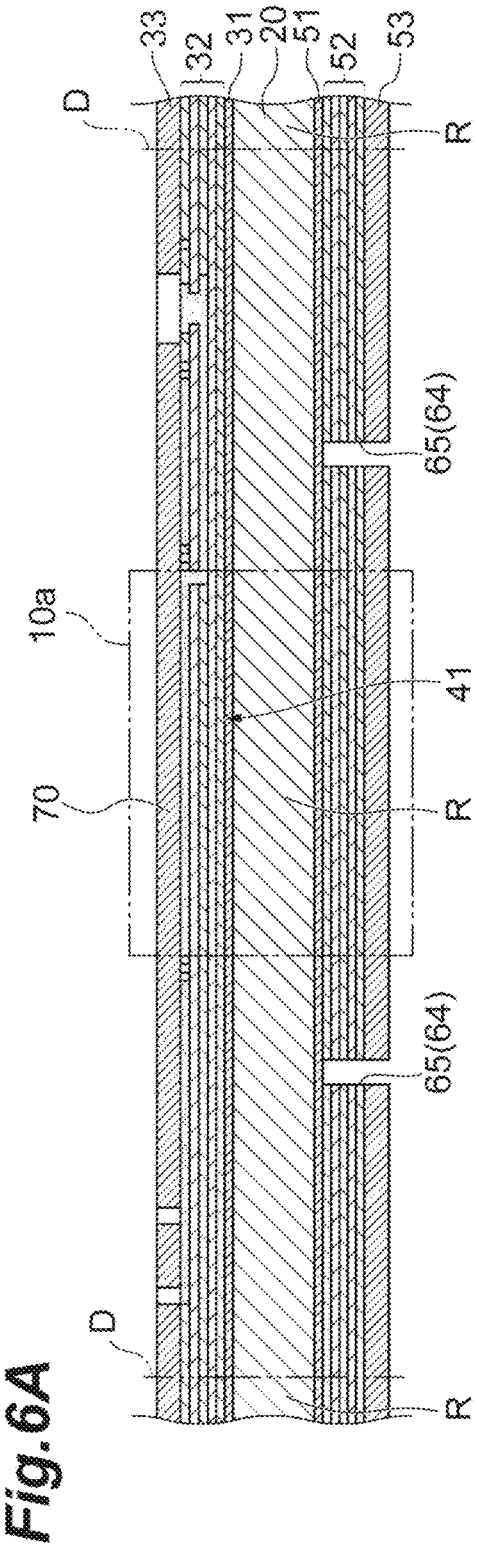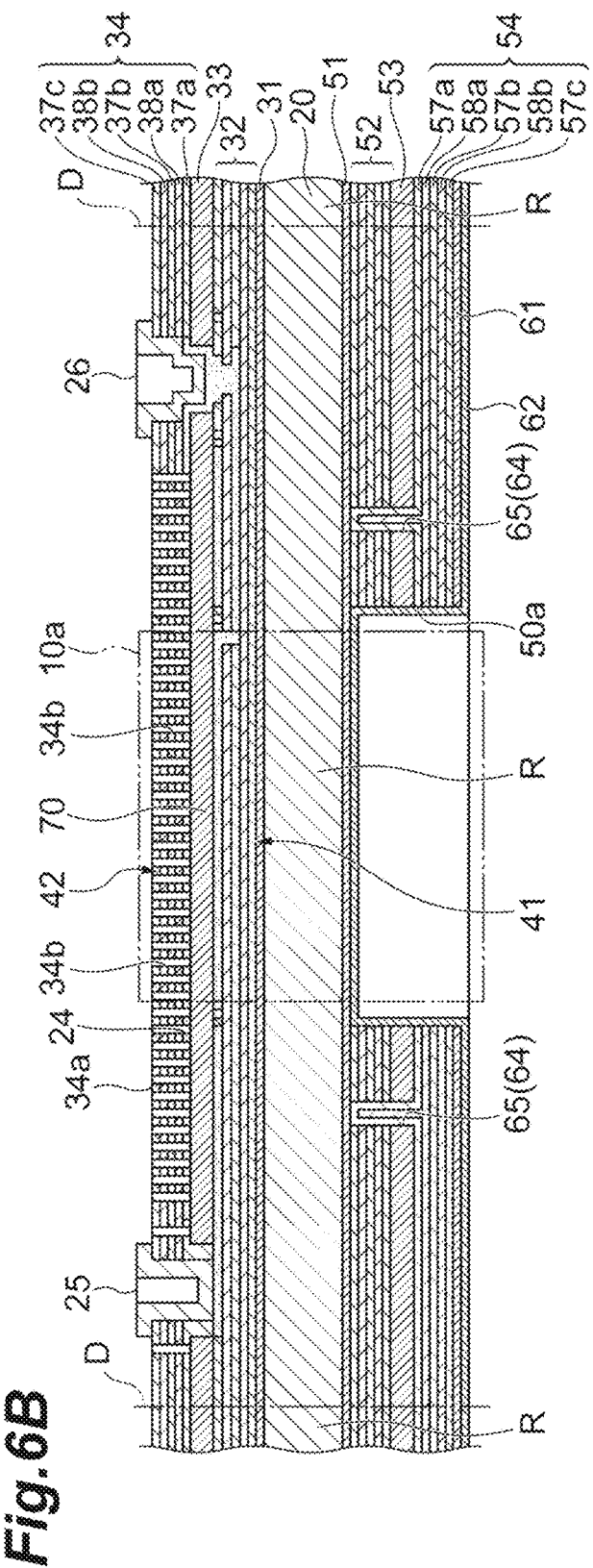

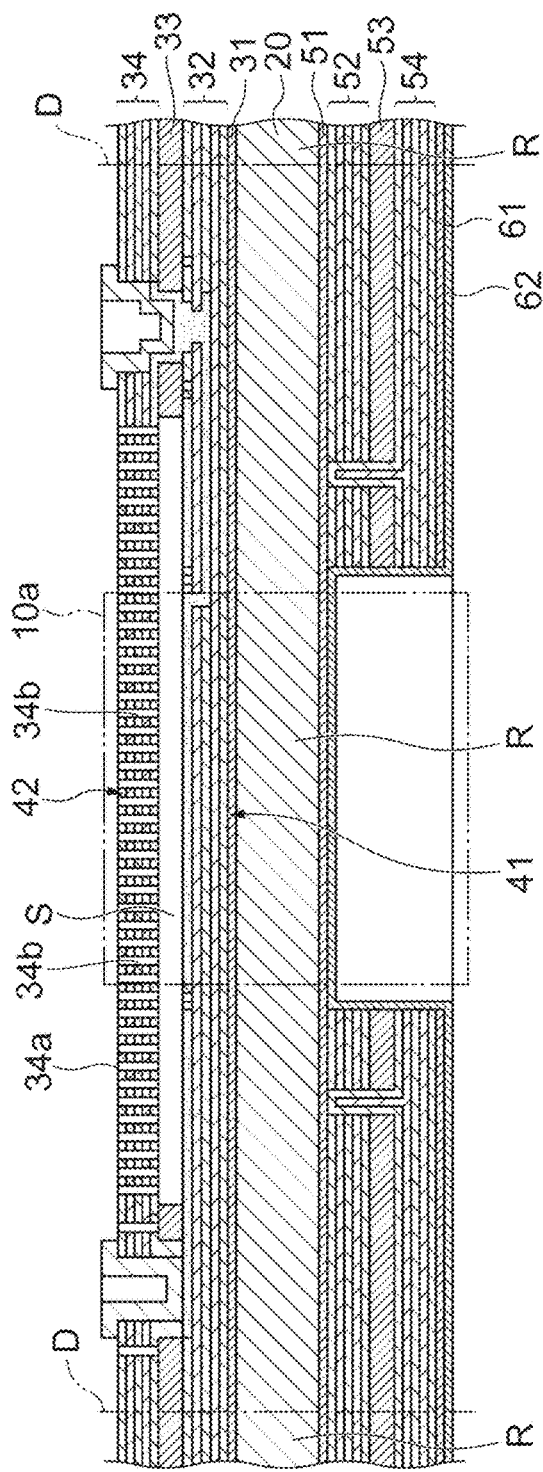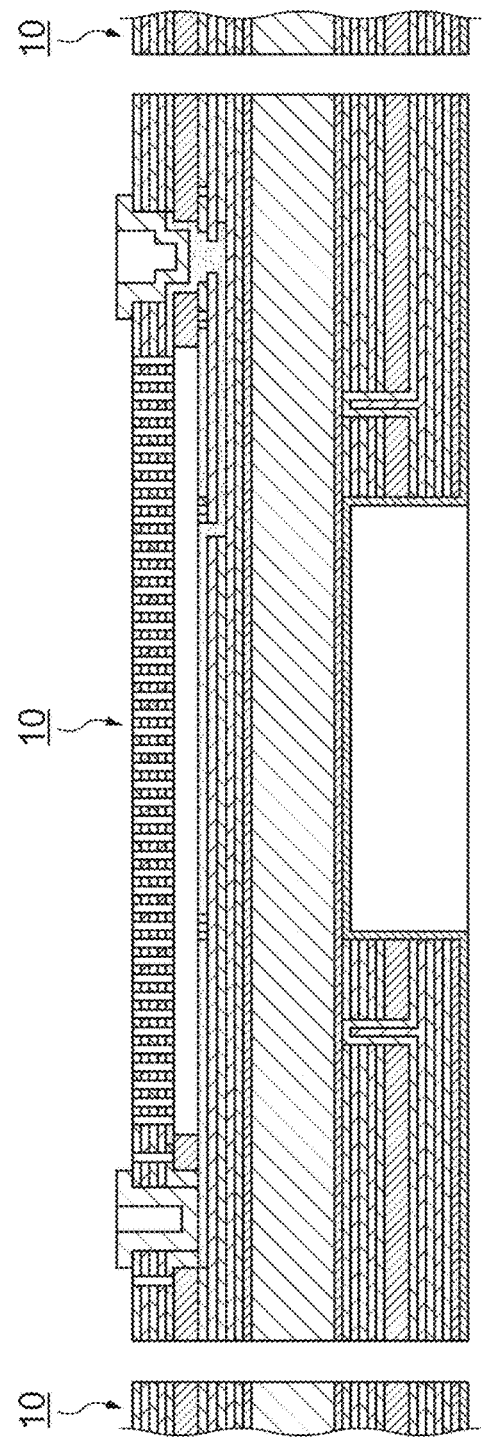
Fig. 7A
Fig. 7B

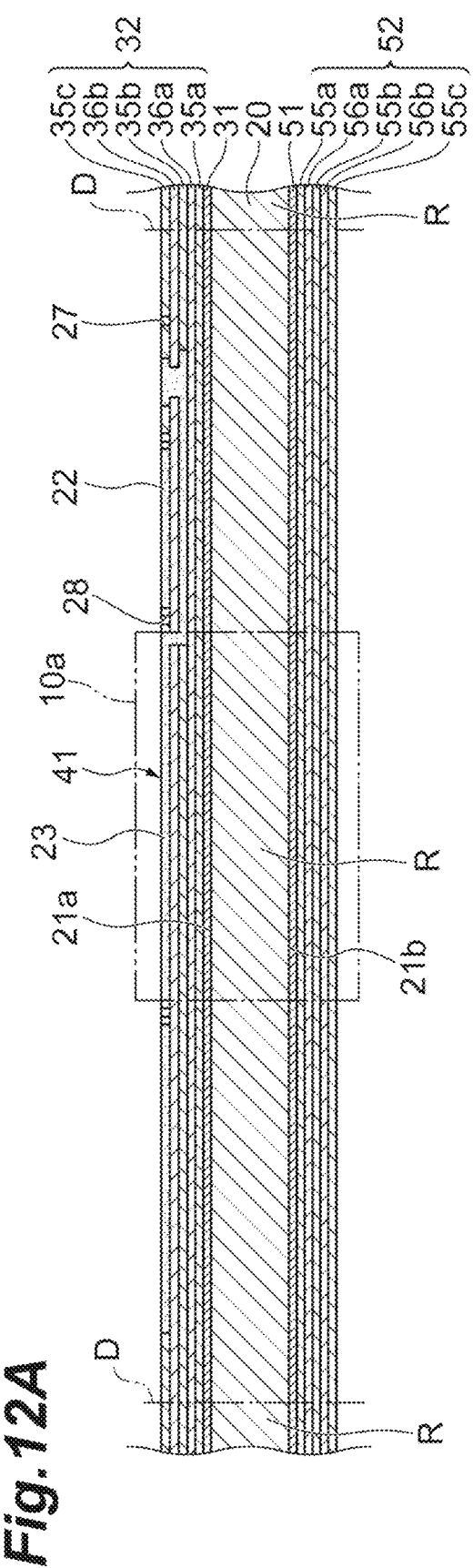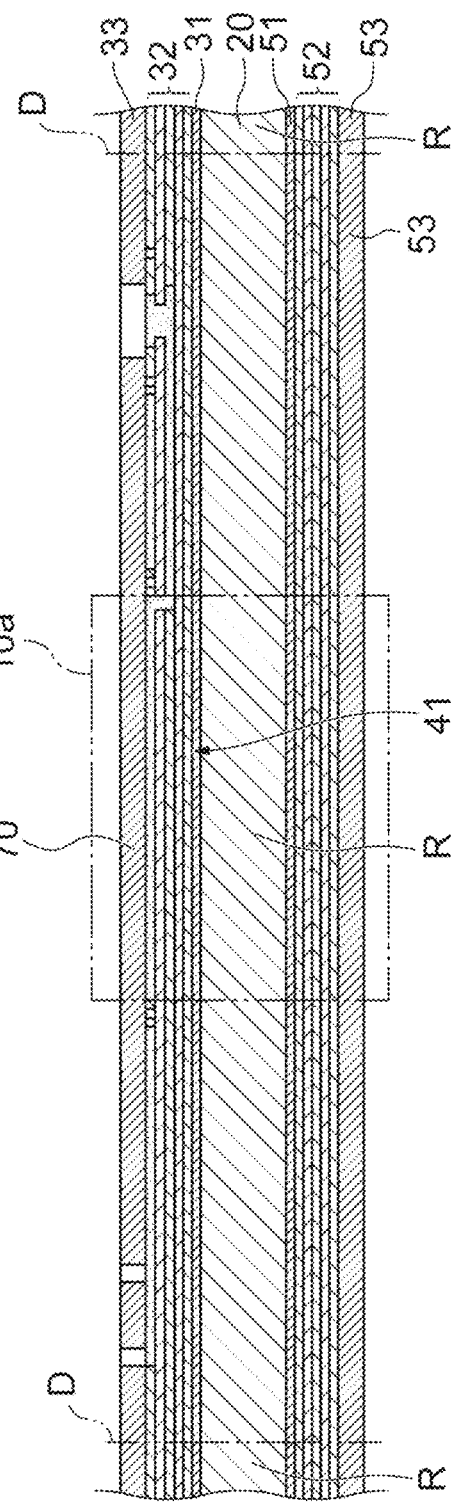

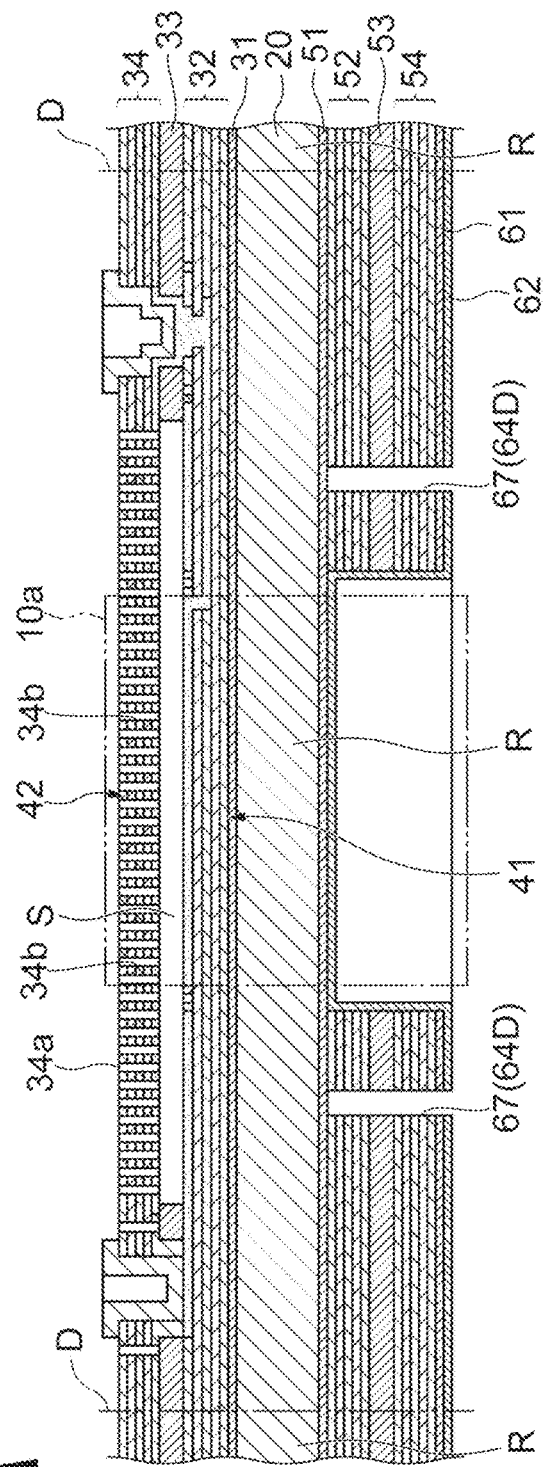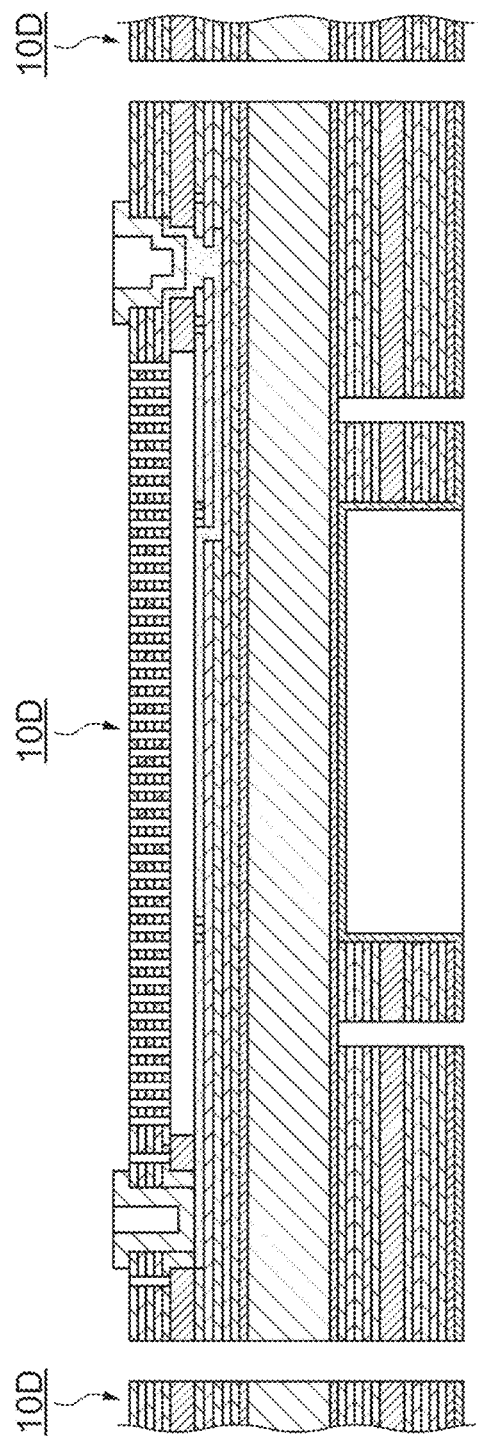

FABRY-PEROT INTERFERENCE FILTER AND LIGHT-DETECTING DEVICE

TECHNICAL FIELD

One aspect of the present invention relates to a Fabry-Perot interference filter and a light-detecting device.

BACKGROUND

A conventional Fabry-Perot interference filter is known which includes a substrate and a layer structure disposed on a surface of the substrate and in which the layer structure is provided with a first mirror portion and a second mirror portion facing each other with an air gap therebetween, and a distance between the first mirror portion and the second mirror portion is varied (for example, refer to Japanese Unexamined Patent Publication No. 2013-257561). In the Fabry-Perot interference filter, the distance between the first mirror portion and the second mirror portion is controlled by electrostatic force according to an application voltage, such that light having a desired wavelength transmits the Fabry-Perot interference filter.

SUMMARY

In the Fabry-Perot interference filter, if the distance between the first mirror portion and the second mirror portion is not controlled with high precision, it is difficult to obtain a superior light transmission characteristic (that is, a characteristic capable of transmitting the light having the desired wavelength).

Accordingly, an object of one aspect of the present invention is to provide a Fabry-Perot interference filter and a light-detecting device in which a superior light transmission characteristic is obtained.

A Fabry-Perot interference filter according to one aspect of the present invention includes: a substrate having a first surface and a second surface facing each other; a first layer structure disposed on the first surface; and a second layer structure disposed on the second surface, wherein the first layer structure is provided with a first mirror portion and a second mirror portion facing each other with an air gap therebetween, and a distance between the first mirror portion and the second mirror portion is varied, and the second layer structure is formed with a separation region separating at least a part of the second layer structure into one side and another side in a direction along the second surface.

In the Fabry-Perot interference filter, the first layer structure is disposed on the first surface of the substrate and the second layer structure is disposed on the second surface facing the first surface. As a result, a stress balance between the first surface side of the substrate and the second surface side thereof is improved and deformation (warp and so on) of the substrate is suppressed. In addition, in the Fabry-Perot interference filter, the separation region separating at least a part of the second layer structure into one side and the other side in the direction along the second surface of the substrate is formed in the second layer structure. As a result, the stress balance between the first surface side of the substrate and the second surface side thereof is further improved and an influence of the deformation of the second layer structure due to a temperature change is suppressed from being transmitted to the first layer structure. As such, according to the Fabry-Perot interference filter, the distance between the first mirror portion and the second mirror portion can be controlled with high precision and a superior light transmission characteristic can be obtained.

In the Fabry-Perot interference filter according to one aspect of the present invention, an end of the separation region opposite to the substrate may be located inside the second layer structure. According to this configuration, because the separation region is avoided from being exposed to the outside, strength of the second layer structure can be secured.

In the Fabry-Perot interference filter according to one aspect of the present invention, the first layer structure has a first laminate disposed on the first surface and including the first mirror portion, a second laminate disposed on the side opposite to the substrate with respect to the first laminate and including the second mirror portion, and a first intermediate layer disposed between the first laminate and the second laminate and defining the air gap, the second layer structure has a third laminate disposed on the second surface and corresponding to the first laminate, a fourth laminate disposed on the side opposite to the substrate with respect to the third laminate and corresponding to the second laminate, and a second intermediate layer disposed between the third laminate and the fourth laminate and corresponding to the first intermediate layer, and the separation region may be formed over at least both the third laminate and the second intermediate layer. According to this configuration, the stress balance between the first surface side of the substrate and the second surface side thereof is effectively improved and an influence of the deformation of the second layer structure due to the temperature change is more surely suppressed from being transmitted to the first layer structure.

In the Fabry-Perot interference filter according to one aspect of the present invention, the separation region may be configured as a groove or the separation region may be configured as a crack. According to this configuration, a function and an effect of the separation region described above are surely achieved.

In the Fabry-Perot interference filter according to one aspect of the present invention, the separation region may extend linearly when viewed from a direction perpendicular to the second surface. According to this configuration, the function and the effect of the separation region described above are surely achieved.

A light-detecting device according to one aspect of the present invention includes: the Fabry-Perot interference filter; a light detector detecting light having transmitted the Fabry-Perot interference filter; and a support portion supporting the Fabry-Perot interference filter from a second layer structure side. In the light-detecting device, because the Fabry-Perot interference filter is included, as described above, the distance between the first mirror portion and the second mirror portion can be controlled with high precision and the superior light transmission characteristic can be obtained. In addition, a support portion supports the Fabry-Perot interference filter from the second layer structure side, and the separation region is formed in the second layer structure. Therefore, an influence of deformation of the support portion due to the temperature change is suppressed from being transmitted to the first layer structure. From this, the distance between the first mirror portion and the second mirror portion can be controlled with high precision and the superior light transmission characteristic can be obtained.

In the Fabry-Perot interference filter according to one aspect of the present invention, the substrate has a polygonal plate shape.

In the Fabry-Perot interference filter according to one aspect of the present invention, the separation region may extend in a direction crossing each side of the substrate when viewed from the direction perpendicular to the second surface or may extend annularly when viewed from the direction perpendicular to the second surface. According to this configuration, damage such as peeling can be suppressed from occurring in the second layer structure.

In the Fabry-Perot interference filter according to one aspect of the present invention, the first layer structure has a first laminate disposed on the first surface and including the first mirror portion, a second laminate disposed on the side opposite to the substrate with respect to the first laminate and including the second mirror portion, and a first intermediate layer disposed between the first laminate and the second laminate and defining the air gap, the second layer structure has a third laminate disposed on the second surface and corresponding to the first laminate, a fourth laminate disposed on the side opposite to the substrate with respect to the third laminate and corresponding to the second laminate, and a second intermediate layer disposed between the third laminate and the fourth laminate and corresponding to the first intermediate layer, and the separation region may be formed over at least both the third laminate and the second intermediate layer. According to this configuration, the stress balance between the first surface side of the substrate and the second surface side thereof is effectively improved and an influence of the deformation of the second layer structure due to the temperature change is more surely suppressed from being transmitted to the first layer structure.

In the Fabry-Perot interference filter according to one aspect of the present invention, the separation region may be configured as a groove or the separation region may be configured as a crack. According to this configuration, the function and the effect of the separation region described above are surely achieved.

In the Fabry-Perot interference filter according to one aspect of the present invention, an end of the separation region opposite to the substrate may reach a surface of the second layer structure opposite to the substrate. According to this configuration, the function and the effect of the separation region described above are surely achieved.

In the light-detecting device according to one aspect of the present invention, the Fabry-Perot interference filter; a light detector detecting light having transmitted the Fabry-Perot interference filter; and a support portion supporting the Fabry-Perot interference filter from a second layer structure side. In the light-detecting device, because the Fabry-Perot interference filter is included, as described above, the distance between the first mirror portion and the second mirror portion can be controlled with high precision and the superior light transmission characteristic can be obtained. In addition, a support portion supports the Fabry-Perot interference filter from the second layer structure side, the separation region being formed in the second layer structure. Therefore, an influence of deformation of the support portion due to the temperature change is suppressed from being transmitted to the first layer structure. From this, the distance between the first mirror portion and the second mirror portion can be controlled with high precision and the superior light transmission characteristic can be obtained.

BRIEF DESCRIPTION OF THE DRAWINGS

FIGS. 5A and 5B are diagrams illustrating a method of manufacturing the Fabry-Perot interference filter of FIG. 1;

FIGS. 6A and 6B are diagrams illustrating a method of manufacturing the Fabry-Perot interference filter of FIG. 1;

FIGS. 7A and 7B are diagrams illustrating a method of manufacturing the Fabry-Perot interference filter of FIG. 1;

FIGS. 12A and 12B are diagrams illustrating a method of manufacturing the Fabry-Perot interference filter of FIG. 10;

FIGS. 14A and 14B are diagrams illustrating a method of manufacturing the Fabry-Perot interference filter of FIG. 10;

DETAILED DESCRIPTION

Figure 1:
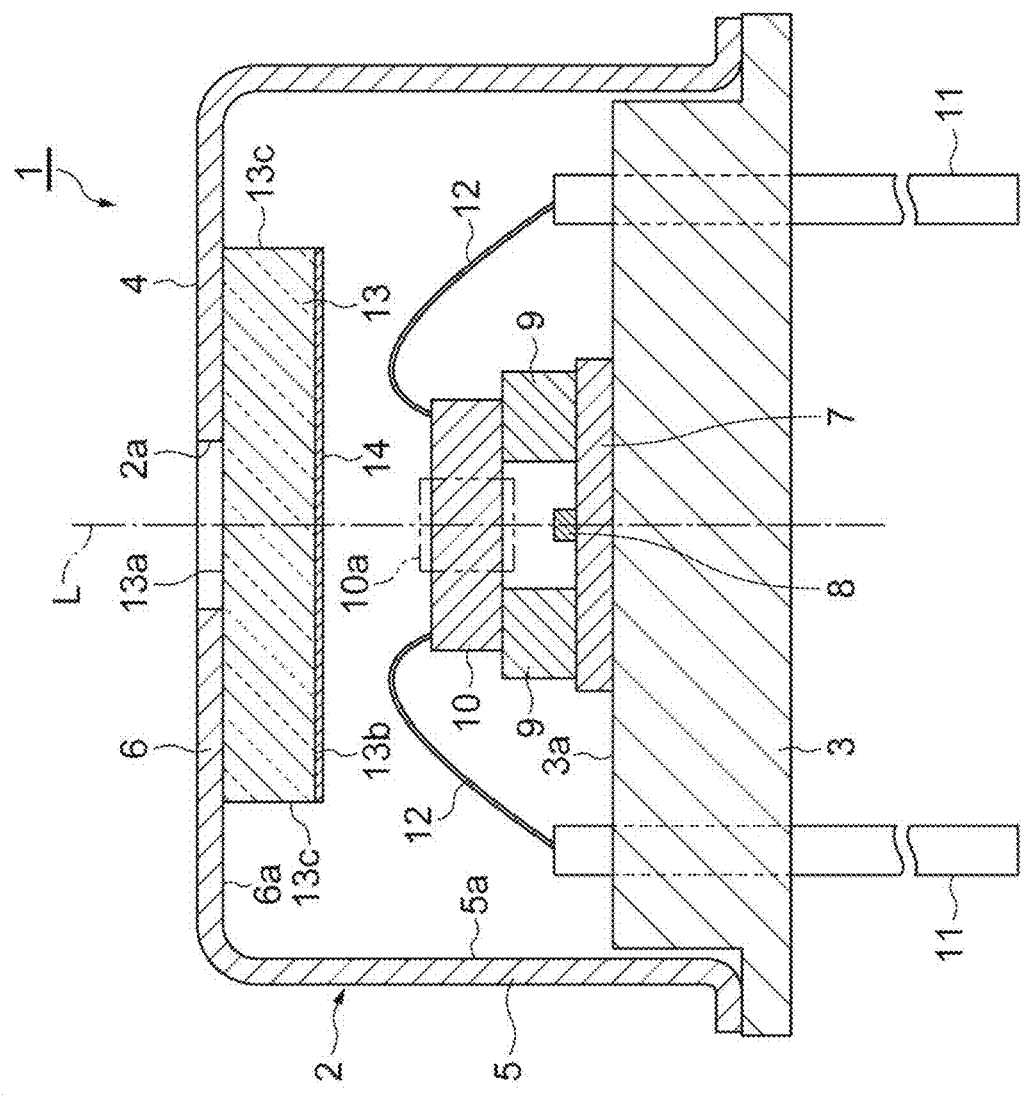
FIG. 1 is a cross-sectional view of a light-detecting device according to an embodiment of the present invention.

Hereinafter, an embodiment of the present invention will be described in detail with reference to the drawings. In the following description, the same or equivalent elements are denoted with the same reference numerals and overlapped description is omitted.

Configuration of Light-Detecting Device

As illustrated in FIG. 1, a light-detecting device 1 includes a package 2. The package 2 is a CAN package that has a stem 3 and a cap 4. The cap 4 is configured integrally by side walls 5 and a top wall 6. The top wall 6 faces the stem 3 in a direction parallel to a predetermined line L. The stem 3 and the cap 4 are made of a metal, for example, and are airtightly bonded to each other.

A wiring substrate 7 is fixed on an inner surface 3a of the stem 3. As examples of a substrate material of the wiring substrate 7, silicon, ceramic, quartz, glass, and plastic can be used. A light detector 8 and a temperature compensation element (not illustrated in the drawings) such as a thermistor are mounted on the wiring substrate 7. The light detector 8 is disposed on the line L. More specifically, the light detector 8 is disposed such that a center line of a light reception unit thereof is matched with the line L. The light detector 8 is an infrared detector such as a quantum-type sensor using InGaAs and a thermal-type sensor using a thermopile or a bolometer, for example. When light of individual wavelength regions such as an ultraviolet wavelength region, a visible wavelength region, and a near-infrared wavelength region is detected, a silicon photodiode can be used as the light detector 8. The light detector 8 may be provided with one light reception unit and may be a photodiode array in which a plurality of light reception units are provided in an array shape, a CCD image sensor, or a CMOS image sensor. In addition, the plurality of light detectors 8 may be mounted on the wiring substrate 7.

A plurality of spacers (support portions) 9 are fixed on the wiring substrate 7. As examples of a material of each spacer 9, silicon, ceramic, quartz, glass, and plastic can be used. A Fabry-Perot interference filter 10 is fixed on the plurality of spacers 9 by means of an adhesive. The Fabry-Perot interference filter 10 is disposed on the line L. More specifically, the Fabry-Perot interference filter 10 is disposed such that a center line of a light transmission region 10a thereof is matched with the line L. The spacers 9 support the Fabry-Perot interference filter 10 from a light emission side (side of a second layer structure 16 to be described later). In addition, the spacers 9 may be configured integrally with the wiring substrate 7. In this case, a member configured by the wiring substrate 7 and the spacers 9 may be a support portion that supports the Fabry-Perot interference filter 10. In addition, the Fabry-Perot interference filter 10 may be supported by one spacer 9, not the plurality of spacers 9.

A plurality of lead pins 11 are fixed on the stem 3. More specifically, the individual lead pins 11 penetrate the stem 3 in a state in which an electrical insulation property with the stem 3 and airtightness are maintained. An electrode pad provided in the wiring substrate 7, a terminal of the light detector 8, a terminal of the temperature compensation element, and a terminal of the Fabry-Perot interference filter 10 are electrically connected to the individual lead pins 11 by wires 12. As a result, an input/output of an electric signal for each of the light detector 8, the temperature compensation element, and the Fabry-Perot interference filter 10 is enabled.

An opening 2a is provided in the package 2. More specifically, the opening 2a is provided in the top wall 6 of the cap 4, such that a center line thereof is matched with the line L. A light transmission member 13 is disposed on an inner surface 6a of the top wall 6 to close the opening 2a. The light transmission member 13 is airtightly bonded to the inner surface 6a of the top wall 6. The light transmission member 13 transmits at least light of a measurement wavelength range of the light-detecting device 1. The light transmission member 13 is a member of a plate shape that includes a light incidence surface 13a and a light emission surface 13b facing each other in a direction parallel to the line L, and lateral surfaces 13c. The light transmission member 13 is made of glass, quartz, silicon, germanium, or plastic, for example.

The light emission surface 13b of the light transmission member 13 is provided with a band-pass filter 14. The band-pass filter 14 is disposed on the light emission surface 13b of the light transmission member 13 by vapor deposition and pasting, for example. The band-pass filter 14 selectively transmits the light of the measurement wavelength range of the light-detecting device 1. The band-pass filter 14 is a dielectric multilayer film composed of a combination of a high refractive index material such as $TiO_2$ and $Ta_2O_5$ and a low refractive index material such as $SiO_2$ and $MgF_2$.

In the light-detecting device 1, the package 2 accommodates the wiring substrate 7, the light detector 8, the temperature compensation element (not illustrated in the drawings), the plurality of spacers 9, and the Fabry-Perot interference filter 10. In the package 2, the light detector 8 is located at the light emission side of the Fabry-Perot interference filter 10 on the line L and the opening 2a and the light transmission member 13 are located at the light incidence side of the Fabry-Perot interference filter 10 on the line L.

In the light-detecting device 1 configured as described above, if light is incident on the light transmission region 10a of the Fabry-Perot interference filter 10 via the opening 2a, the light transmission member 13, and the band-pass filter 14 from the outside, light having a predetermined wavelength is selectively transmitted (to be described in detail later). The light having transmitted the light transmission region 10a of the Fabry-Perot interference filter 10 is incident on the light reception unit of the light detector 8 and is detected by the light detector 8.

Configuration of Fabry-Perot Interference Filter

Figure 2:
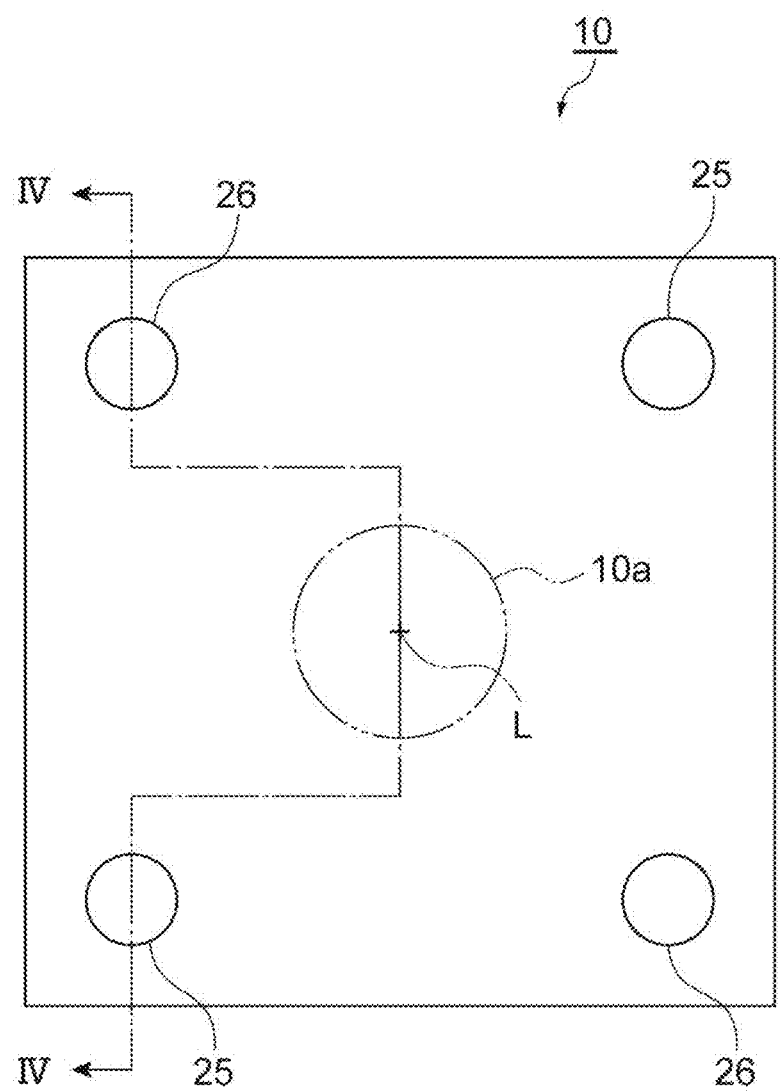
FIG. 2 is a plan view of a Fabry-Perot interference filter of FIG. 1.
Figure 3:
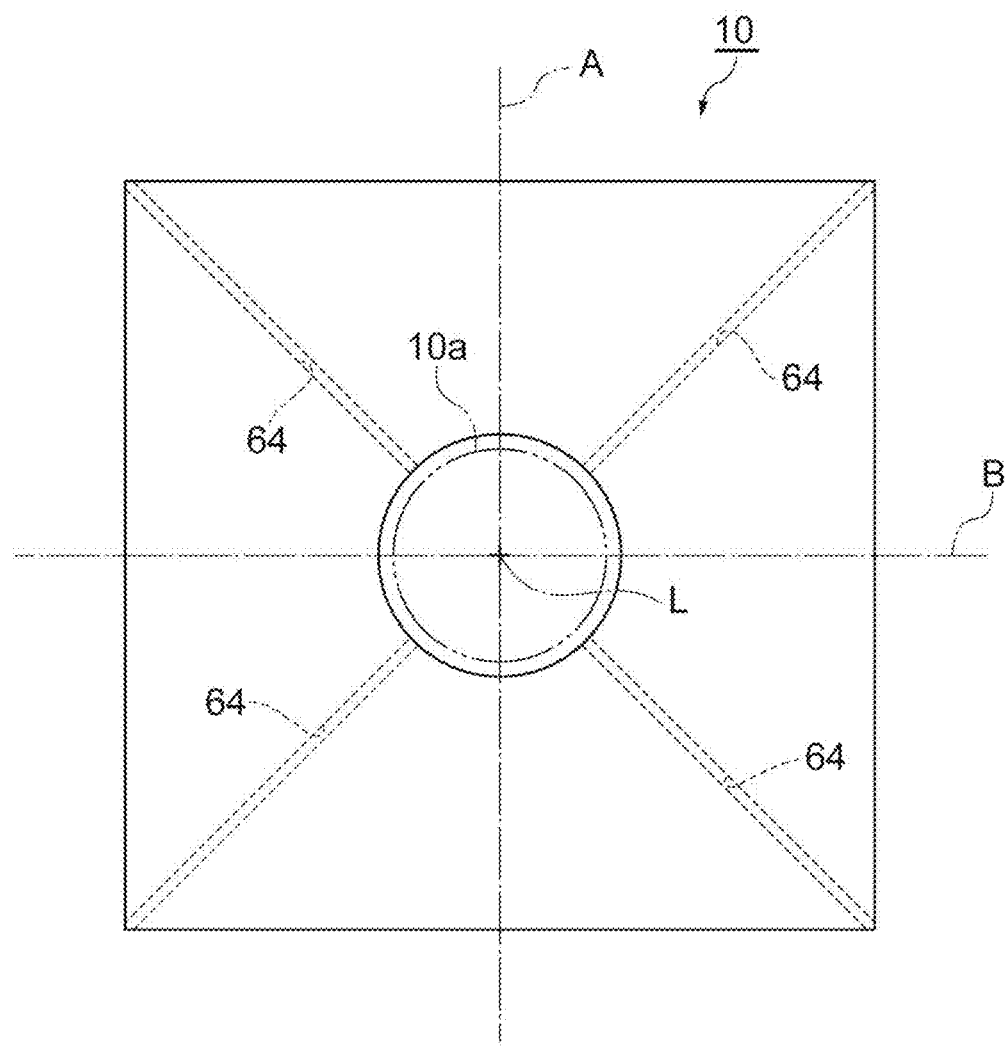
FIG. 3 is a bottom view of the Fabry-Perot interference filter of FIG. 1.
Figure 4:
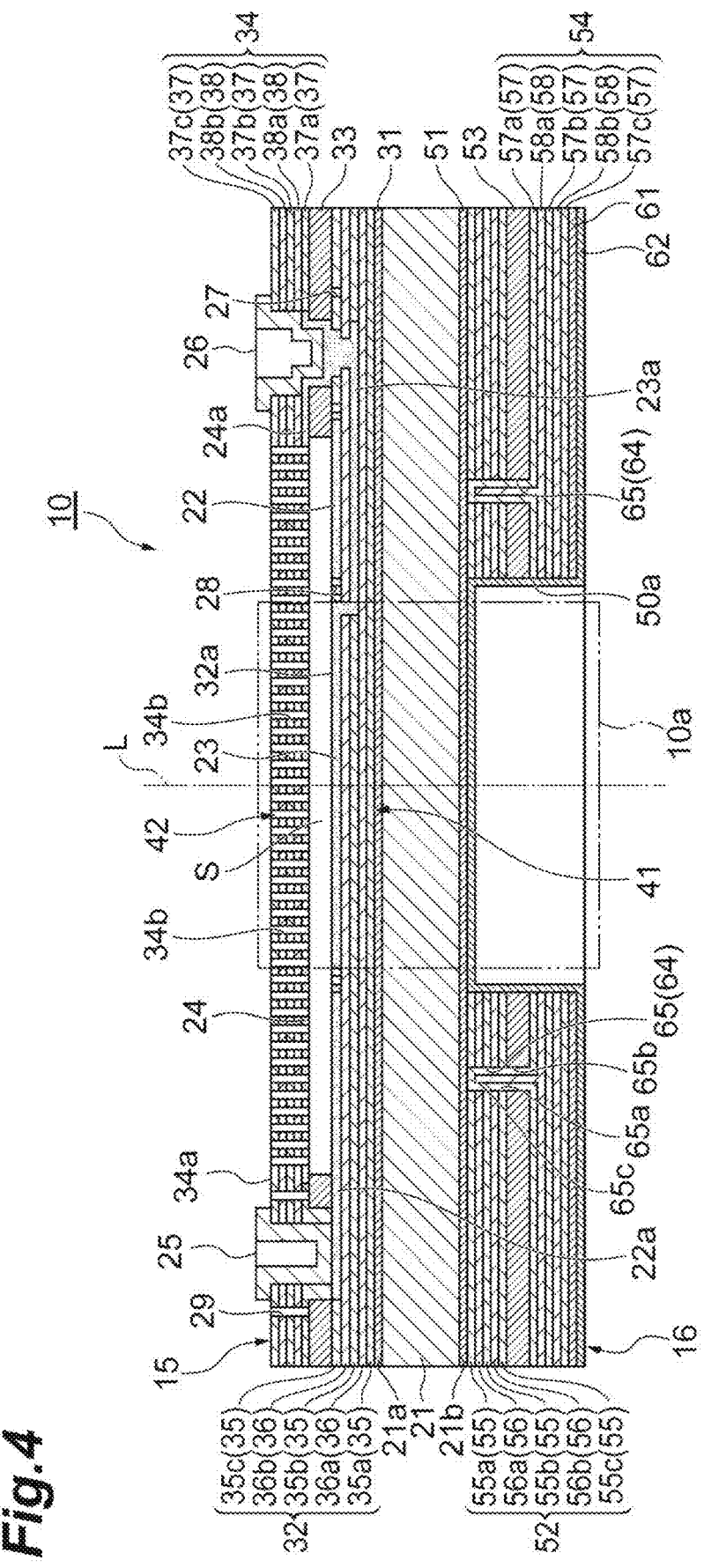
FIG. 4 is a cross-sectional view of the Fabry-Perot interference filter taken along line IV-IV of FIG. 2.

As illustrated in FIGS. 2 to 4, in the Fabry-Perot interference filter 10, the light transmission region 10a to transmit light according to a distance between a first mirror portion and a second mirror portion is provided on the line L. The light transmission region 10a is a columnar region, for example. In the light transmission region 10a, the distance between the first mirror portion and the second mirror portion is controlled with high precision. That is, the light transmission region 10a is a region of the Fabry-Perot interference filter 10 where the distance between the first mirror portion and the second mirror portion can be controlled to a predetermined distance to selectively transmit the light having the predetermined wavelength and is a region where the light according to the distance between the first mirror portion and the second mirror portion, having the predetermined wavelength, can be transmitted.

The Fabry-Perot interference filter 10 includes a substrate 21 of a rectangular plate shape. The substrate 21 has a first surface 21a and a second surface 21b that face each other. The first surface 21a is a surface of the light incidence side. The second surface 21b is a surface of the light emission side. A first layer structure 15 is disposed on the first surface 21a. A second layer structure 16 is disposed on the second surface 21b.

The first layer structure 15 is configured by sequentially laminating a reflection prevention layer 31, a first laminate 32, a first intermediate layer 33, and a second laminate 34 on the first surface 21a. An air gap S is defined by the first intermediate layer 33 of a frame shape, between the first laminate 32 and the second laminate 34. The substrate 21 is made of silicon, quartz, or glass, for example. When the substrate 21 is made of silicon, the reflection prevention layer 31 and the first intermediate layer 33 are made of silicon oxide, for example. A thickness of the first intermediate layer 33 is several ten nm to several ten μm, for example.

A portion of the first laminate 32 corresponding to the light transmission region 10a functions as the first mirror portion 41. The first mirror portion 41 is disposed on the first surface 21a with the reflection prevention layer 31 between the first mirror portion 41 and the first surface 21a. The first laminate 32 is configured by laminating a plurality of polysilicon layers 35 and a plurality of silicon nitride layers 36 alternately. In this embodiment, a polysilicon layer 35a, a silicon nitride layer 36a, a polysilicon layer 35b, a silicon nitride layer 36b, and a polysilicon layer 35c are sequentially laminated on the reflection prevention layer 31. An optical thickness of each of the polysilicon layer 35 and the silicon nitride layer 36 configuring the first mirror portion 41 is preferably the integral multiple of ¼ of a center transmission wavelength. In addition, the first mirror portion 41 may be directly disposed on the first surface 21a without the reflection prevention layer 31 between the first mirror portion 41 and the first surface 21a.

A portion of the second laminate 34 corresponding to the light transmission region 10a functions as the second mirror portion 42. The second mirror portion 42 faces the first mirror portion 41 with the air gap S between the second mirror portion 42 and the first mirror portion 41 at the side opposite to the substrate 21 with respect to the first mirror portion 41. The second mirror portion 42 is disposed on the first surface 21a with the reflection prevention layer 31, the first laminate 32, and the first intermediate layer 33 between the second mirror portion 42 and the first surface 21a. The second laminate 34 is configured by laminating a plurality of polysilicon layers 37 and a plurality of silicon nitride layers 38 alternately. In this embodiment, a polysilicon layer 37a, a silicon nitride layer 38a, a polysilicon layer 37b, a silicon nitride layer 38b, and a polysilicon layer 37c are sequentially laminated on the first intermediate layer 33. An optical thickness of each of the polysilicon layer 37 and the silicon nitride layer 38 configuring the second mirror portion 42 is preferably the integral multiple of ¼ of the center transmission wavelength.

In the first laminate 32 and the second laminate 34, instead of the silicon nitride layer, a silicon oxide layer may be used. In addition, titanium oxide, tantalum oxide, zirconium oxide, magnesium fluoride, aluminum oxide, calcium fluoride, silicon, germanium, or zinc sulfide may be used as a material of each layer configuring the first laminate 32 and the second laminate 34.

A plurality of through-holes 34b reaching from a surface 34a of the second laminate 34 opposite to the first intermediate layer 33 to the air gap S are formed in a portion corresponding to the air gap S in the second laminate 34. The plurality of through-holes 34b are formed not to substantially affect a function of the second mirror portion 42. The plurality of through-holes 34b are used to form the air gap S by removing a part of the first intermediate layer 33 by etching.

In the first mirror portion 41, a first electrode 22 is formed to surround the light transmission region 10a. The first electrode 22 is formed by doping impurities into the polysilicon layer 35c and decreasing resistance. In the first mirror portion 41, a second electrode 23 is formed to include the light transmission region 10a. The second electrode 23 is formed by doping impurities into the polysilicon layer 35c and decreasing resistance. A size of the second electrode 23 is preferably a size including an entire region of the light transmission region 10a. However, the size of the second electrode 23 may be nearly equal to a size of the light transmission region 10a.

In the second mirror portion 42, a third electrode 24 is formed. The third electrode 24 faces the first electrode 22 and the second electrode 23 with the air gap S between the third electrode 24 and the first electrode 22 and the second electrode 23. The third electrode 24 is formed by doping impurities into the polysilicon layer 37a and decreasing resistance.

A pair of terminals 25 are provided to face each other with the light transmission region 10a between the pair of terminals 25. Each terminal 25 is disposed in a through-hole reaching from the surface 34a of the second laminate 34 to the first laminate 32. Each terminal 25 is electrically connected to the first electrode 22 via a wiring line 22a.

A pair of terminals 26 are provided to face each other with the light transmission region 10a between the pair of terminals 26. Each terminal 26 is disposed in a through-hole reaching from the surface 34a of the second laminate 34 to an inner portion of the first intermediate layer 33. Each terminal 26 is electrically connected to the second electrode 23 via a wiring line 23a and is electrically connected to the third electrode 24 via a wiring line 24a. A facing direction of one pair of terminals 25 and a facing direction of one pair of terminals 26 are orthogonal to each other (refer to FIG. 2).

Trenches 27 and 28 are provided in the surface 32a of the first laminate 32. The trench 27 extends annularly to surround a connection portion with the terminal 26 in the wiring line 23a. The trench 27 electrically insulates the first electrode 22 and the wiring line 23a. The trench 28 extends annularly along an inner edge of the first electrode 22. The trench 28 electrically insulates the first electrode 22 and an inside region (second electrode 23) of the first electrode 22. An inner region of each of the trenches 27 and 28 may be an insulating material and may be an air gap.

A trench 29 is provided in the surface 34a of the second laminate 34. The trench 29 extends annularly to surround the terminal 25. The trench 29 electrically insulates the terminal 25 and the third electrode 24. An inner region of the trench 29 may be an insulating material and may be an air gap.

The second layer structure 16 is configured by sequentially laminating a reflection prevention layer 51, a third laminate 52, a second intermediate layer 53, and a fourth laminate 54 on the second surface 21b. The reflection prevention layer 51, the third laminate 52, the second intermediate layer 53, and the fourth laminate 54 are configured to correspond to the reflection prevention layer 31, the first laminate 32, the first intermediate layer 33, and the second laminate 34. That is, the reflection prevention layer 51 and the second intermediate layer 53 are formed to have the same thicknesses as the thicknesses of the reflection prevention layer 31 and the first intermediate layer 33, using the same materials as the materials of the reflection prevention layer 31 and the first intermediate layer 33. The third laminate 52 and the fourth laminate 54 have lamination structures symmetrical to lamination structures of the first laminate 32 and the second laminate 34, on the basis of the substrate 21.

Specifically, the third laminate 52 is configured by laminating a plurality of polysilicon layers 55 and a plurality of silicon nitride layers 56 alternately. In this embodiment, a polysilicon layer 55a, a silicon nitride layer 56a, a polysilicon layer 55b, a silicon nitride layer 56b, and a polysilicon layer 55c are sequentially laminated on the reflection prevention layer 51. The fourth laminate 54 is configured by laminating a plurality of polysilicon layers 57 and a plurality of silicon nitride layers 58 alternately. In this embodiment, a polysilicon layer 57a, a silicon nitride layer 58a, a polysilicon layer 57b, a silicon nitride layer 58b, and a polysilicon layer 57c are sequentially laminated on the second intermediate layer 53. The polysilicon layers 55 and 57 and the silicon nitride layers 56 and 58 are formed to have the same thicknesses as the thicknesses of the polysilicon layers 35 and 37 and the silicon nitride layers 36 and 38, using the same materials as the materials of the polysilicon layers 35 and 37 and the silicon nitride layers 36 and 38.

In the third laminate 52, the second intermediate layer 53, and the fourth laminate 54, an opening 50a is provided to include the light transmission region 10a. The opening 50a has a diameter that is nearly equal to a size of the light transmission region 10a. The opening 50a is opened to the light emission side and a bottom surface of the opening 50a reaches the reflection prevention layer 51. A center line of the opening 50a is matched with the line L. A light shielding layer 61 is formed on a surface of the fourth laminate 54 at the light emission side. The light shielding layer 61 is made of aluminum, for example. A protection layer 62 is formed on a surface of the light shielding layer 61 and an inner surface of the opening 50a. The protection layer 62 is made of aluminum oxide, for example. In addition, a thickness of the protection layer 62 is set to 1 to 100 nm (preferably, about 40 nm), so that an optical influence by the protection layer 62 can be ignored.

As illustrated in FIGS. 3 and 4, four separation regions 64 are formed in the second layer structure 16. The individual separation regions 64 separate at least a part of the second layer structure 16 into one side and the other side in a direction along the second surface 21b.

Shapes and a position relation of the four separation regions 64 when viewed from a direction perpendicular to the second surface 21b (in a plan view) are as follows. Each separation region 64 extends linearly in a direction crossing each side of the substrate 21. The four separation regions 64 are disposed to be line-symmetrical with respect to each of a line A passing through the line L and orthogonal to one side of the substrate 21 and a line B passing through the line L and orthogonal to the line A. The four separation regions 64 are disposed radially with the line L as a center. Each separation region 64 is disposed between an outer edge of the opening 50a and an outer edge of the substrate 21. In this embodiment, one end of each separation region 64 reaches the outer edge of the opening 50a and the other end thereof reaches a corner portion of the substrate 21. That is, each separation region 64 is provided in a region different from the light transmission region 10a in the second layer structure 16. As a result, an influence on a light transmission characteristic by the separation regions 64 can be suppressed without depending on widths of the separation regions 64. In this embodiment, the four separation regions 64 include two pairs of separation regions 64 in which each pair of separation regions 64 face each other with the opening 50a between the separation regions 64. A facing direction of one pair of separation regions 64 and a facing direction of the other pair of separation regions 64 are orthogonal to each other.

The separation region 64 is formed over both the third laminate 52 and the second intermediate layer 53. The separation region 64 separates the third laminate 52 and the second intermediate layer 53 into one side and the other side in the direction along the second surface 21b. An end of the separation region 64 at the side of the substrate 21 reaches the reflection prevention layer 51. An end of the separation region 64 opposite to the substrate 21 is located at a boundary of the second intermediate layer 53 and the fourth laminate 54.

In this embodiment, the separation region 64 is configured as a groove 65 having a cross section of a rectangular shape. In the groove 65, an inner surface 65a of one side in the direction along the second surface 21b and an inner surface 65b of the other side are separated from each other. A bottom surface 65c of the groove 65 reaches the reflection prevention layer 51. The polysilicon layer 57a and the silicon nitride layer 58a configuring the fourth laminate 54 enter the groove 65.

In the Fabry-Perot interference filter 10 configured as described above, if a voltage is applied between the first electrode 22 and the third electrode 24 via the terminals 25 and 26, electrostatic force according to the voltage is generated between the first electrode 22 and the third electrode 24. The second mirror portion 42 is attracted to the side of the first mirror portion 41 fixed on the substrate 21 by the electrostatic force and the distance between the first mirror portion 41 and the second mirror portion 42 is adjusted. As such, in the Fabry-Perot interference filter 10, the distance between the first mirror portion 41 and the second mirror portion 42 is varied.

A wavelength of light transmitting the Fabry-Perot interference filter 10 depends on the distance between the first mirror portion 41 and the second mirror portion 42 in the light transmission region 10a. Therefore, the wavelength of the transmitted light can be appropriately selected by adjusting the voltage applied between the first electrode 22 and the third electrode 24. At this time, the second electrode 23 has the same potential as the potential of the third electrode 24. Therefore, the second electrode 23 functions as a compensation electrode to evenly maintain the first mirror portion 41 and the second mirror portion 42 in the light transmission region 10a.

In the Fabry-Perot interference filter 10, for example, the light having transmitted the light transmission region 10a of the Fabry-Perot interference filter 10 is detected by the light detector 8 while a voltage applied to the Fabry-Perot interference filter 10 is changed (that is, the distance between the first mirror portion 41 and the second mirror portion 42 in the Fabry-Perot interference filter 10 is changed), so that a spectral spectrum can be obtained.

As described above, in the Fabry-Perot interference filter 10, the first layer structure 15 is disposed on the first surface 21a of the substrate 21 and the second layer structure 16 is disposed on the second surface 21b facing the first surface 21a. As a result, a stress balance between the side of the first surface 21a of the substrate 21 and the side of the second surface 21b thereof is improved and deformation (warp and so on) of the substrate 21 is suppressed. In addition, in the Fabry-Perot interference filter 10, the separation regions 64 separating at least a part of the second layer structure 16 into one side and the other side in the direction along the second surface 21b of the substrate 21 are formed in the second layer structure 16. As a result, the stress balance between the side of the first surface 21a of the substrate 21 and the side of the second surface 21b thereof is further improved and an influence of the deformation of the second layer structure 16 due to a temperature change is suppressed from being transmitted to the first layer structure 15. As such, according to the Fabry-Perot interference filter 10, the distance between the first mirror portion 41 and the second mirror portion 42 can be controlled with high precision and a superior light transmission characteristic can be obtained.

In addition, in the Fabry-Perot interference filter 10, an end of the separation region 64 opposite to the substrate 21 is located inside the second layer structure 16. Therefore, because the separation region 64 is avoided from being exposed to the outside, strength of the second layer structure 16 can be secured. As a result, cracks or the like can be suppressed from occurring in the second layer structure 16 at the time of use and so on. For example, even when cutting a wafer including a plurality of portions corresponding to the Fabry-Perot interference filters 10 into the plurality of portions by forming starting points in the wafer and expanding an expanding tape, the cracks are extended with the separation regions 64 as the starting points and damage is prevented from occurring in the Fabry-Perot interference filter 10.

In addition, in the Fabry-Perot interference filter 10, the first layer structure 15 has the first laminate 32 including the first mirror portion 41, the second laminate 34 including the second mirror portion 42, and the first intermediate layer 33 defining the air gap S and the second layer structure 16 has the third laminate 52 configured to correspond to the first laminate 32, the fourth laminate 54 configured to correspond to the second laminate 34, and the second intermediate layer 53 configured to correspond to the first intermediate layer 33. In addition, the separation regions 64 are formed over both the third laminate 52 and the second intermediate layer 53. As a result, the stress balance between the side of the first surface 21a of the substrate 21 and the side of the second surface 21b thereof is improved more effectively and the deformation of the second layer structure 16 due to the temperature change is more surely suppressed from being transmitted to the first layer structure 15. More specifically, because the separation regions 64 are formed in the second intermediate layer 53 easily causing the change in the stress balance, an imbalance of the stress can be effectively suppressed from occurring between the side of the first surface 21a of the substrate 21 and the side of the second surface 21b thereof. In addition, because the separation regions 64 are formed over both the third laminate 52 and the second intermediate layer 53, a contribution of the second layer structure 16 to the internal stress in the Fabry-Perot interference filter 10 can be further reduced. The reason why the second intermediate layer 53 easily causes an increase in the internal stress is that the second intermediate layer 53 is generally formed thicker than each layer configuring the third laminate 52 and the fourth laminate 54.

In addition, in the Fabry-Perot interference filter 10, the separation regions 64 are configured as the grooves 65. As a result, a function and an effect of the separation regions 64 described above are surely achieved.

In addition, in the Fabry-Perot interference filter 10, the separation regions 64 extend linearly when viewed from the direction perpendicular to the second surface 21b. As a result, the function and the effect of the separation regions 64 described above are surely achieved.

The light-detecting device 1 includes the Fabry-Perot interference filter 10, the light detector 8 to detect the light having transmitted the Fabry-Perot interference filter 10, and the spacers 9 to support the Fabry-Perot interference filter 10 from the side of the second layer structure 16. In the light-detecting device 1, because the Fabry-Perot interference filter 10 is included, as described above, the distance between the first mirror portion 41 and the second mirror portion 42 can be controlled with high precision and the superior light transmission characteristic can be obtained. In addition, the spacers 9 support the Fabry-Perot interference filter 10 from the side of the second layer structure 16 in which the separation regions 64 are formed. Therefore, an influence of the deformation of the spacers 9 due to the temperature change is suppressed from being transmitted to the first layer structure 15. From this, the distance between the first mirror portion 41 and the second mirror portion 42 can be controlled with high precision and the superior light transmission characteristic can be obtained.

Method of Manufacturing Fabry-Perot Interference Filter

Next, an example of a method of manufacturing the Fabry-Perot interference filter 10 will be described with reference to FIGS. 5A to 7B. First, as illustrated in FIG. 5A, a wafer 20 including a plurality of portions R corresponding to the substrates 21 is prepared and the first laminate 32 including the first mirror portion 41 and the third laminate 52 configured to correspond to the first laminate 32 are formed for each portion R of the wafer 20 corresponding to the substrate 21 (a first step). The wafer 20 is a silicon wafer, for example. In the wafer 20, the portions R are disposed in a two-dimensional matrix shape to be adjacent to each other. A dicing line D is set to each boundary between the portions R.

In the first step, first, the reflection prevention layer 31 is formed on the first surface 21a of the portion R and the reflection prevention layer 51 is formed on the second surface 21b of the portion R at the same time as the formation of the reflection prevention layer 31. Next, the polysilicon layer 35a, the silicon nitride layer 36a, the polysilicon layer 35b, the silicon nitride layer 36b, and the polysilicon layer 35c configuring the first laminate 32 are sequentially laminated on the reflection prevention layer 31. At the same time as the lamination of the first laminate 32, the polysilicon layer 55a, the silicon nitride layer 56a, the polysilicon layer 55b, the silicon nitride layer 56b, and the polysilicon layer 55c configuring the third laminate 52 are sequentially laminated on the reflection prevention layer 51. In addition, in parallel with the lamination of the first laminate 32, the first electrode 22 and the second electrode 23 are formed by doping impurities into the polysilicon layers 35b and 35c and decreasing resistance partially. Next, the trenches 27 and 28 are formed by the etching.

Next, as illustrated in FIGS. 5B and 6A, the first intermediate layer 33 including a removal scheduled portion 70 corresponding to the air gap S and the second intermediate layer 53 configured to correspond to the first intermediate layer 33 are formed for each portion R (a second step). In the second step, first, the first intermediate layer 33 is formed on the first laminate 32 and the second intermediate layer 53 is formed on the third laminate 52 at the same time as the formation of the first intermediate layer 33. Next, the air gap is formed in the portions corresponding to the wiring line 23a and the terminals 25 and 26 of FIG. 4 by the etching. At the same time as the etching, the grooves 65 (separation regions 64) are formed over both the third laminate 52 and the second intermediate layer 53 by the etching.

Next, as illustrated in FIG. 6B, the second laminate 34 including the second mirror portion 42 and the fourth laminate 54 configured to correspond to the second laminate 34 are formed for each portion R (a third step).

In the third step, first, the polysilicon layer 37a, the silicon nitride layer 38a, the polysilicon layer 37b, the silicon nitride layer 38b, and the polysilicon layer 37c configuring the second laminate 34 are sequentially laminated on the first intermediate layer 33. Meanwhile, at the same time as the lamination of the second laminate 34, the polysilicon layer 57a, the silicon nitride layer 58a, the polysilicon layer 57b, the silicon nitride layer 58b, and the polysilicon layer 57c configuring the fourth laminate 54 are sequentially laminated on the second intermediate layer 53. At the time of the lamination of the second laminate 34, the polysilicon layer 57a and the silicon nitride layer 58a enter the groove 65. In addition, in parallel with the lamination of the second laminate 34, the third electrode 24 is formed by doping impurities into the polysilicon layer 37a and decreasing resistance partially. Next, the terminals 25 and 26 are formed.

Next, the through-hole 34b reaching from the surface 34a of the second mirror portion 42 to the removal scheduled portion 70 is formed by etching the second laminate 34 partially. Next, the light shielding layer 61 is formed on the fourth laminate 54. Next, the opening 50a is formed in the third laminate 52, the second intermediate layer 53, the fourth laminate 54, and the light shielding layer 61 by the etching. Next, the protection layer 62 is formed on the surface of the light shielding layer 61 and the inner surface of the opening 50a.

Next, as illustrated in FIG. 7A, the removal scheduled portion 70 is removed by performing the etching via the through-hole 34b, so that the air gap S located between the first mirror portion 41 and the second mirror portion 42 is formed for each portion R (a fourth step). In the fourth step, the removal scheduled portion 70 is removed by performing vapor phase etching via the through-hole 34b. In the vapor phase etching, for example, hydrofluoric acid gas is used.

Next, as illustrated in FIG. 7B, the wafer 20 is cut on the dicing line D and the Fabry-Perot interference filter 10 is obtained (a fifth step). In the fifth step, a modified region is formed in the wafer 20 along the dicing line D by emitting laser light from the side of the first surface 21a, cleavages are extended in a thickness direction of the wafer 20 from the modified region by tape expanding, and the wafer 20 is cut. In addition, the wafer 20 may be cut by other dicing method such as blade dicing.

Figure 8:
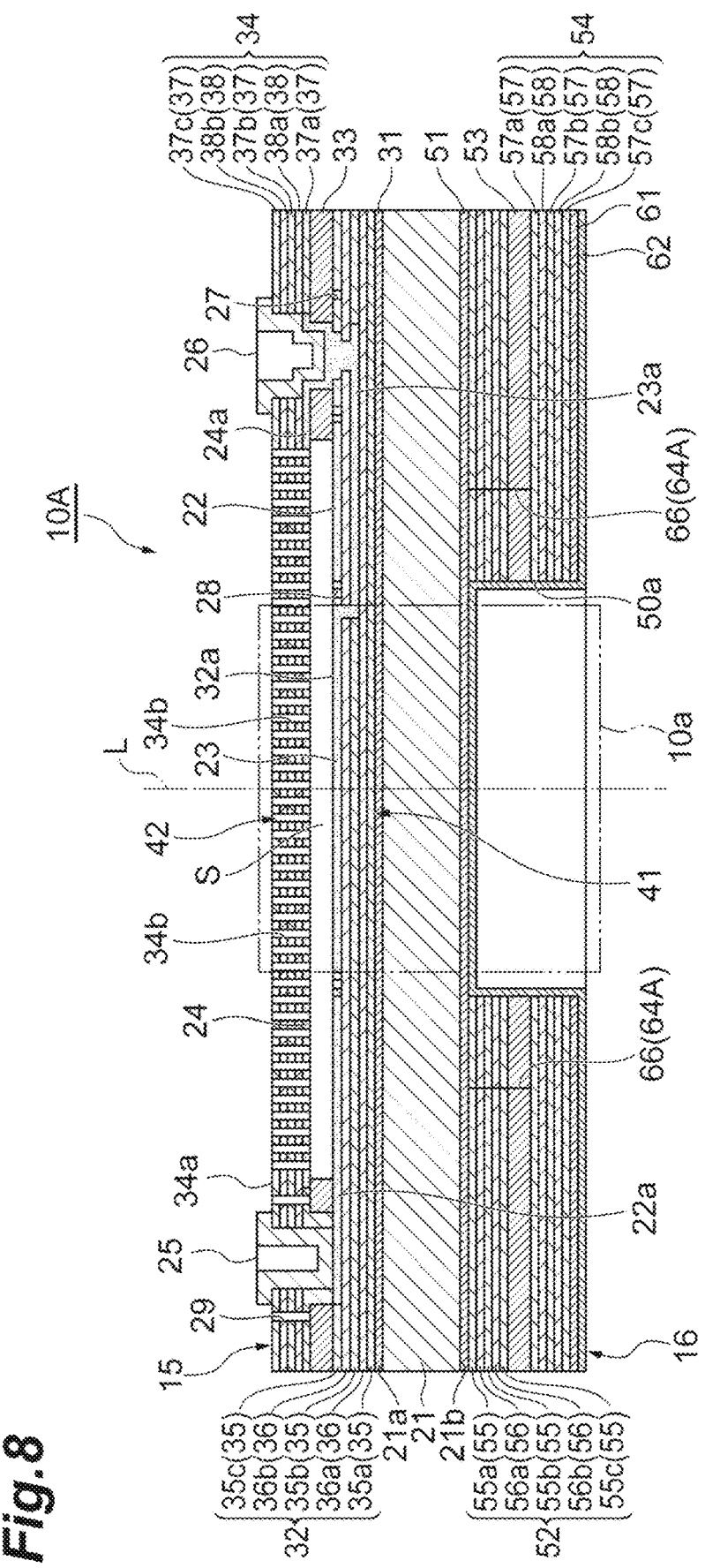
FIG. 8 is a cross-sectional view of a Fabry-Perot interference filter according to a first modification.

The embodiment of the present invention has been described. However, the present invention is not limited to the embodiment. For example, the present invention may be configured like a Fabry-Perot interference filter 10A according to a first modification illustrated in FIG. 8. Separation regions 64A according to the first modification are configured as cracks 66. In the cracks 66, an inner surface of one side and an inner surface of the other side in a direction along the second surface 21b may be separated from each other and may contact each other. For example, in the second step, the cracks 66 can be formed by performing annealing treatment (heating treatment) on the third laminate 52 and the second intermediate layer 53.

Similar to the case of the embodiment, even in the first modification, a distance between the first mirror portion 41 and the second mirror portion 42 can be controlled with high precision and a superior light transmission characteristic can be obtained. In addition, the cracks 66 may be formed intermittently when viewed from a direction perpendicular to the second surface 21b.

Figure 9B:
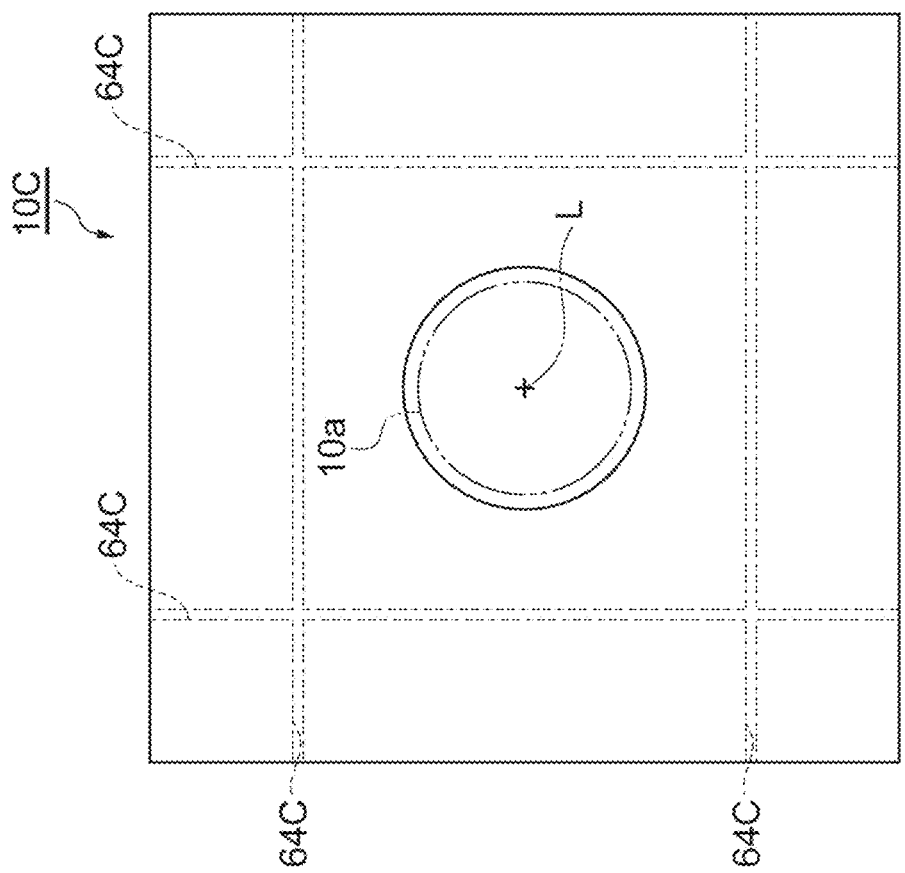
FIG. 9A is a bottom view of a Fabry-Perot interference filter according to a second modification and FIG. 9B is a bottom view of a Fabry-Perot interference filter according to a third modification.
Figure 9A:
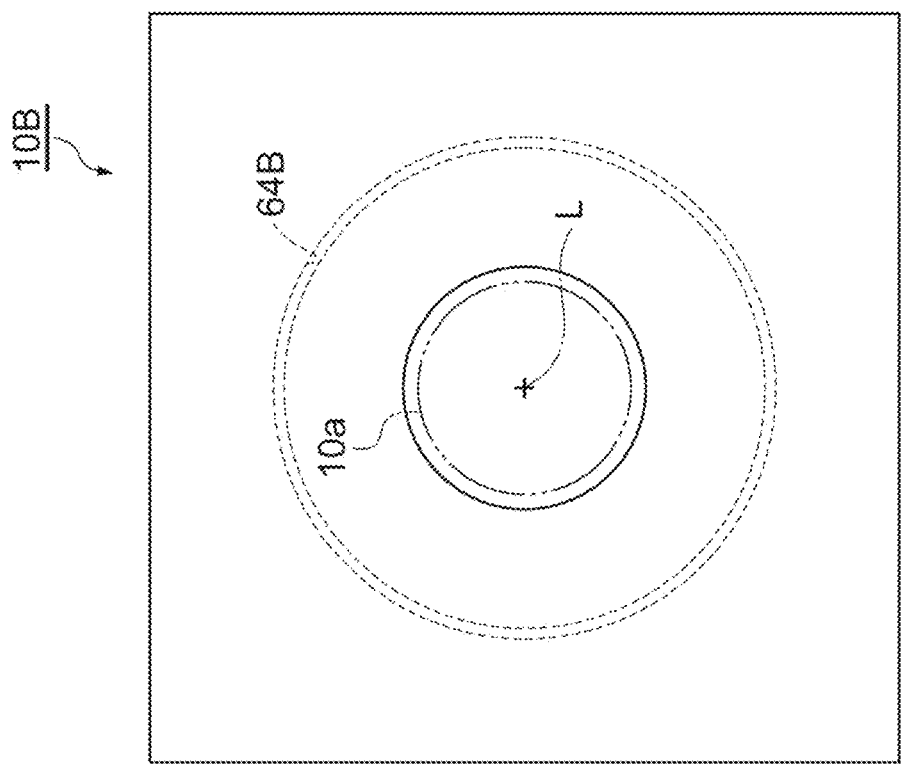

In addition, the present invention may be configured like a Fabry-Perot interference filter 10B according to a second modification illustrated in FIG. 9A. In the second modification, one separation region 64B is formed in the second layer structure 16. The separation region 64B extends annularly to surround the light transmission region 10a, when viewed from a direction perpendicular to the second surface 21b. Here, the separation region 64B extends circularly when viewed from the direction perpendicular to the second surface 21b. The separation region 64B separates the second layer structure 16 into one side and the other side (for example, an inner side and an outer side) in a radial direction of the separation region 64B.

Similar to the case of the embodiment, even in the second modification, a distance between the first mirror portion 41 and the second mirror portion 42 can be controlled with high precision and a superior light transmission characteristic can be obtained. In addition, in the second modification, the separation region 64B extends annularly when viewed from the direction perpendicular to the second surface 21b. As a result, damage such as peeling can be suppressed from occurring in the second layer structure 16. For example, even when cutting a wafer including a plurality of portions corresponding to the Fabry-Perot interference filters 10B into the plurality of portions by forming starting points in the wafer and expanding an expanding tape, the cracks are extended with the separation region 64B as the starting point and damage is prevented from occurring in the Fabry-Perot interference filter 10B. Particularly, as in the second modification, when the separation region 64B extends circularly when viewed from the direction perpendicular to the second surface 21b, a balance is improved and the damage such as the peeling can be suitably suppressed from occurring in the second layer structure 16. In addition, in the second modification, the separation region 64B extends annularly to surround the light transmission region 10a, when viewed from the direction perpendicular to the second surface 21b. For this reason, when the Fabry-Perot interference filter 10B is fixed on the spacers 9 by means of an adhesive, the adhesive can be suppressed from flowing to the light transmission region 10a. In addition, in the second modification, the separation region 64B may extend annularly when viewed from the direction perpendicular to the second surface 21b and may extend in a rectangular annular shape.

In addition, the present invention may be configured like a Fabry-Perot interference filter 10C according to a third modification illustrated in FIG. 9B. In the third modification, four separation regions 64C are disposed in a lattice shape to surround the opening 50a, when viewed from a direction perpendicular to the second surface 21b. Among the four separation regions 64C, the two separation regions 64C facing each other extend in a direction orthogonal to two sides facing each other in the substrate 21. Among the four separation regions 64C, the remaining two separation regions 64C facing each other extend in a direction orthogonal to the remaining two sides facing each other in the substrate 21. Both ends of each separation region 64C reach the sides of the substrate 21.

Similar to the case of the embodiment, even in the third modification, a distance between the first mirror portion 41 and the second mirror portion 42 can be controlled with high precision and a superior light transmission characteristic can be obtained. In addition, in the third modification, the separation regions 64C are disposed in the lattice shape to surround the light transmission region 10a, when viewed from the direction perpendicular to the second surface 21b. As a result, when the Fabry-Perot interference filter 10C is fixed on the spacers 9 by means of an adhesive, the adhesive can be suppressed from flowing to the light transmission region 10a. Particularly, in the third modification, because the ends of each separation region 64C reach the sides of the substrate 21, the adhesive is easy to spread in the separation regions 64C and the adhesive can be effectively suppressed from flowing to the light transmission region 10a.

Figure 10:
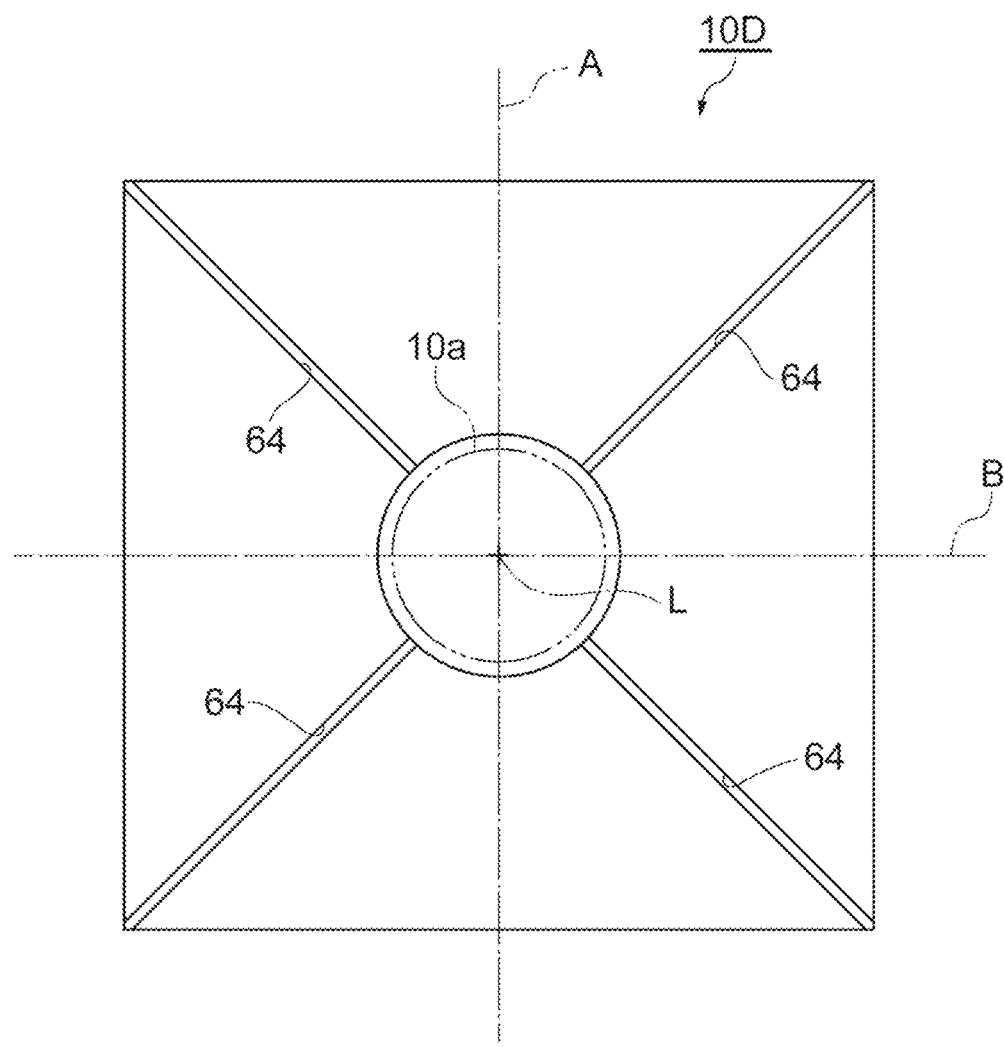
FIG. 10 is a bottom view of a Fabry-Perot interference filter according to a fourth modification.
Figure 11:
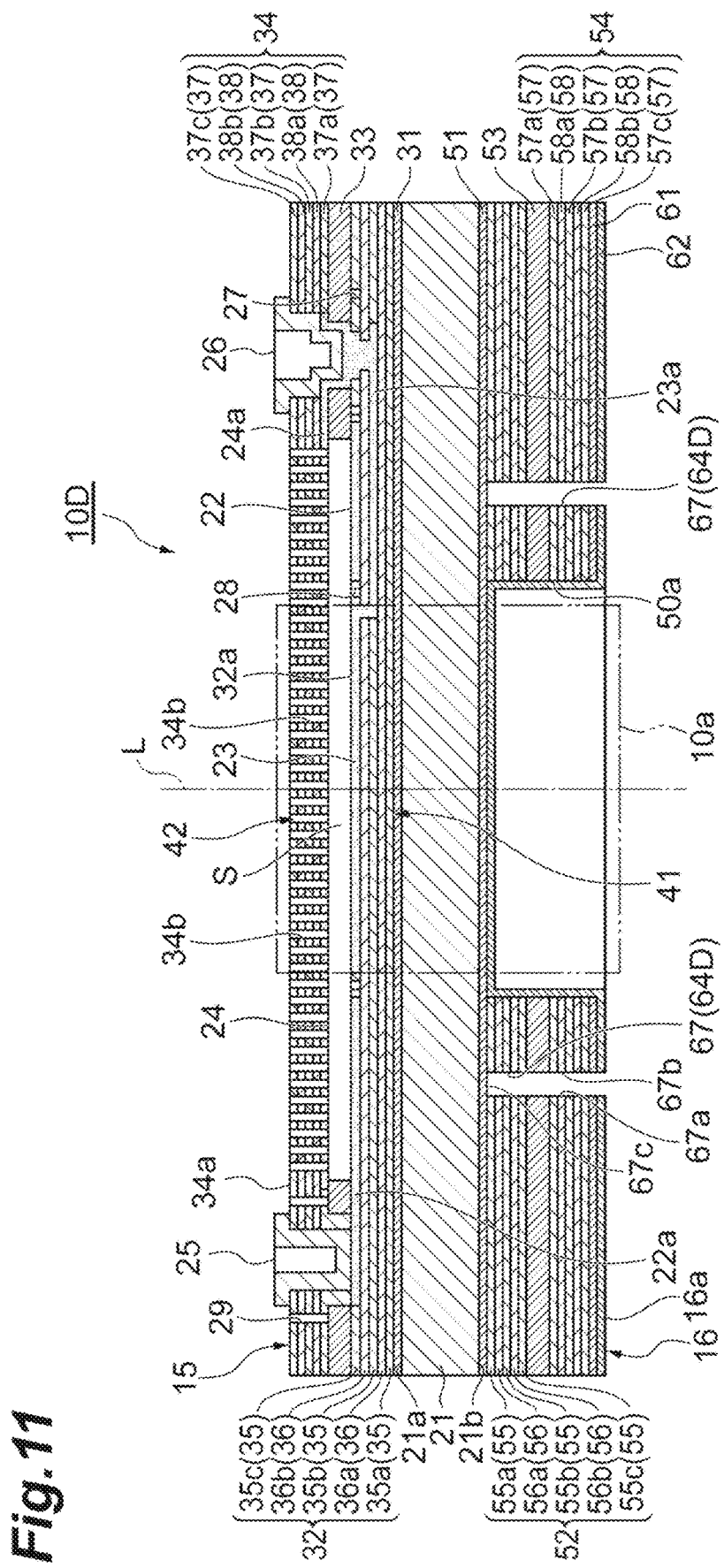
FIG. 11 is a cross-sectional view of the Fabry-Perot interference filter of FIG. 10.

In addition, the present invention may be configured like a Fabry-Perot interference filter 10D according to a fourth modification illustrated in FIGS. 10 and 11. In the fourth modification, separation regions 64D are formed over the third laminate 52, the second intermediate layer 53, the fourth laminate 54, the light shielding layer 61, and the protection layer 62. The separation regions 64D separate the third laminate 52, the second intermediate layer 53, the fourth laminate 54, the light shielding layer 61, and the protection layer 62 into one side and the other side in a direction along the second surface 21b. An end of the separation region 64D at the side of the substrate 21 reaches the reflection prevention layer 51. An end of the separation region 64D opposite to the substrate 21 reaches the surface 16a of the second layer structure 16 opposite to the substrate 21. That is, the end of the separation region 64D opposite to the substrate 21 is exposed to the outside.

In this modification, the separation region 64D is configured as a groove 67 having a cross section of a rectangular shape. The groove 67 is opened to the surface 16a of the second layer structure 16. In the groove 67, the inner surface 67a of one side and the inner surface 67b of the other side in the direction along the second surface 21b are separated from each other. The bottom surface 67c of the groove 67 reaches the reflection prevention layer 51. An inner region of the groove 67 is an air gap.

Similar to the case of the embodiment, even in the fourth modification, a distance between the first mirror portion 41 and the second mirror portion 42 can be controlled with high precision and a superior light transmission characteristic can be obtained. In addition, in the fourth modification, the separation region 64D extends in a direction crossing each side of the substrate 21, when viewed from the direction perpendicular to the second surface 21b. As a result, damage such as peeling can be suppressed from occurring in the second layer structure 16. For example, even when cutting a wafer including a plurality of portions corresponding to the Fabry-Perot interference filters 10D into the plurality of portions by forming starting points in the wafer and expanding an expanding tape, the cracks are extended with the separation regions 64D as the starting points and damage is prevented from occurring in the Fabry-Perot interference filter 10D.

In addition, in the fourth modification, the first layer structure 15 has the first laminate 32 including the first mirror portion 41, the second laminate 34 including the second mirror portion 42, and the first intermediate layer 33 defining the air gap S and the second layer structure 16 has the third laminate 52 configured to correspond to the first laminate 32, the fourth laminate 54 configured to correspond to the second laminate 34, and the second intermediate layer 53 configured to correspond to the first intermediate layer 33. In addition, the separation regions 64D are formed over both the third laminate 52 and the second intermediate layer 53. As a result, the stress balance between the side of the first surface 21a of the substrate 21 and the side of the second surface 21b thereof is improved more effectively and the deformation of the second layer structure 16 due to the temperature change is more surely suppressed from being transmitted to the first layer structure 15. More specifically, because the separation regions 64D are formed in the second intermediate layer 53 easily causing the change in the stress balance, an imbalance of the stress can be effectively suppressed from occurring between the side of the first surface 21a of the substrate 21 and the side of the second surface 21b thereof. In addition, because the separation regions 64D are formed over both the third laminate 52 and the second intermediate layer 53, a contribution of the second layer structure 16 to the internal stress in the Fabry-Perot interference filter 10D can be further reduced. The reason why the second intermediate layer 53 easily causes an increase in the internal stress is that the second intermediate layer 53 is generally formed thicker than each layer configuring the third laminate 52 and the fourth laminate 54.

In addition, in the fourth modification, the separation regions 64D are configured as the grooves 67. As a result, a function and an effect of the separation regions 64D described above are surely achieved.

In addition, in the fourth modification, the end of the separation region 64D opposite to the substrate 21 reaches the surface 16a of the second layer structure 16 opposite to the substrate 21. As a result, the function and the effect of the separation regions 64D described above are surely achieved.

Method of Manufacturing Fabry-Perot Interference Filter According to Fourth Modification Next, an example of a method of manufacturing the Fabry-Perot interference filter 10D will be described with reference to FIGS. 12A to 14B. First, as illustrated in FIG. 12A, a wafer 20 including a plurality of portions R corresponding to the substrates 21 is prepared and the first laminate 32 including the first mirror portion 41 and the third laminate 52 configured to correspond to the first laminate 32 are formed for each portion R of the wafer 20 corresponding to the substrate 21 (a first step). The wafer 20 is a silicon wafer, for example. In the wafer 20, the portions R are disposed in a two-dimensional matrix shape to be adjacent to each other. A dicing line D is set to each boundary between the portions R.

In the first step, first, the reflection prevention layer 31 is formed on the first surface 21a of the portion R and the reflection prevention layer 51 is formed on the second surface 21b of the portion R at the same time as the formation of the reflection prevention layer 31. Next, the polysilicon layer 35a, the silicon nitride layer 36a, the polysilicon layer 35b, the silicon nitride layer 36b, and the polysilicon layer 35c configuring the first laminate 32 are sequentially laminated on the reflection prevention layer 31. At the same time as the lamination of the first laminate 32, the polysilicon layer 55a, the silicon nitride layer 56a, the polysilicon layer 55b, the silicon nitride layer 56b, and the polysilicon layer 55c configuring the third laminate 52 are sequentially laminated on the reflection prevention layer 51. In addition, in parallel with the lamination of the first laminate 32, the first electrode 22 and the second electrode 23 are formed by doping impurities into the polysilicon layers 35b and 35c and decreasing resistance partially. Next, the trenches 27 and 28 are formed by the etching.

Next, as illustrated in FIG. 12B, the first intermediate layer 33 including the removal scheduled portion 70 corresponding to the air gap S and the second intermediate layer 53 configured to correspond to the first intermediate layer 33 are formed for each portion R (a second step). In the second step, first, the first intermediate layer 33 is formed on the first laminate 32 and the second intermediate layer 53 is formed on the third laminate 52 at the same time as the formation of the first intermediate layer 33. Next, the air gap is formed in the portions corresponding to the wiring line 23a and the terminals 25 and 26 of FIG. 11 by the etching.

Figure 13A:
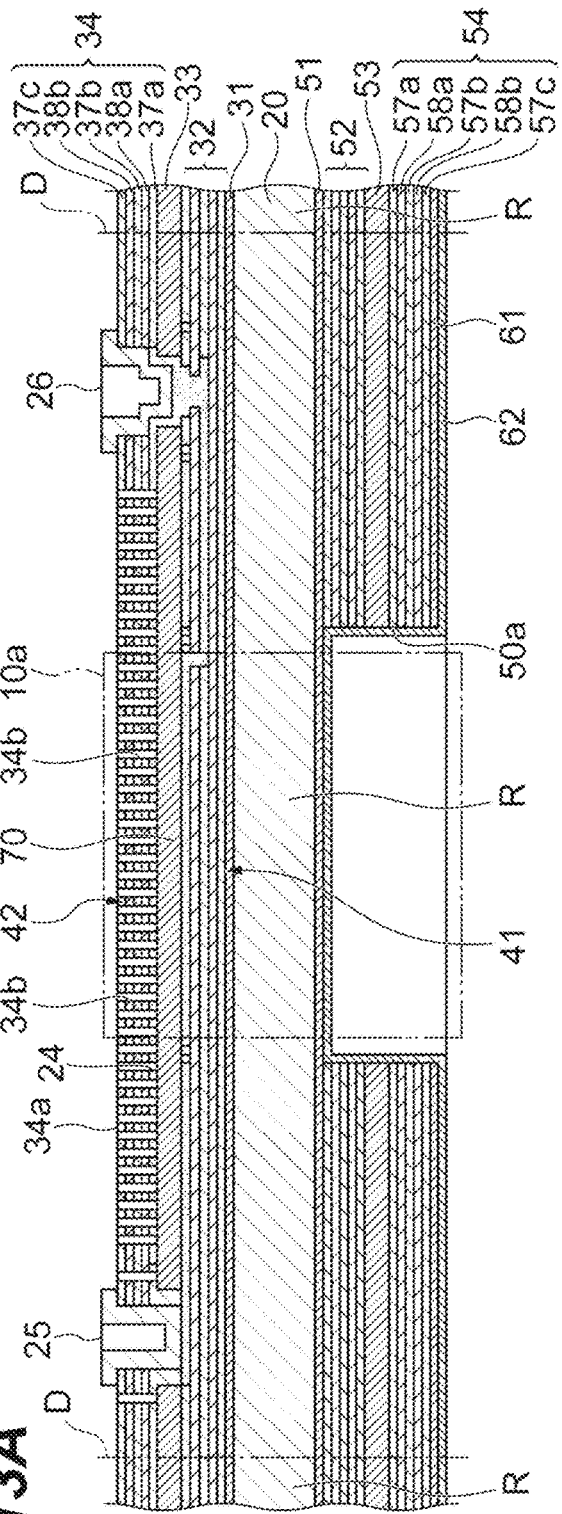
FIGS. 13A and 13B are diagrams illustrating a method of manufacturing the Fabry-Perot interference filter of FIG. 10.

Next, as illustrated in FIG. 13A, the second laminate 34 including the second mirror portion 42 and the fourth laminate 54 configured to correspond to the second laminate 34 are formed for each portion R (a third step).

In the third step, first, the polysilicon layer 37a, the silicon nitride layer 38a, the polysilicon layer 37b, the silicon nitride layer 38b, and the polysilicon layer 37c configuring the second laminate 34 are sequentially laminated on the first intermediate layer 33. Meanwhile, at the same time as the lamination of the second laminate 34, the polysilicon layer 57a, the silicon nitride layer 58a, the polysilicon layer 57b, the silicon nitride layer 58b, and the polysilicon layer 57c configuring the fourth laminate 54 are sequentially laminated on the second intermediate layer 53. In addition, in parallel with the lamination of the second laminate 34, the third electrode 24 is formed by doping impurities into the polysilicon layer 37a and decreasing resistance partially. Next, the terminals 25 and 26 are formed.

Figure 13B:
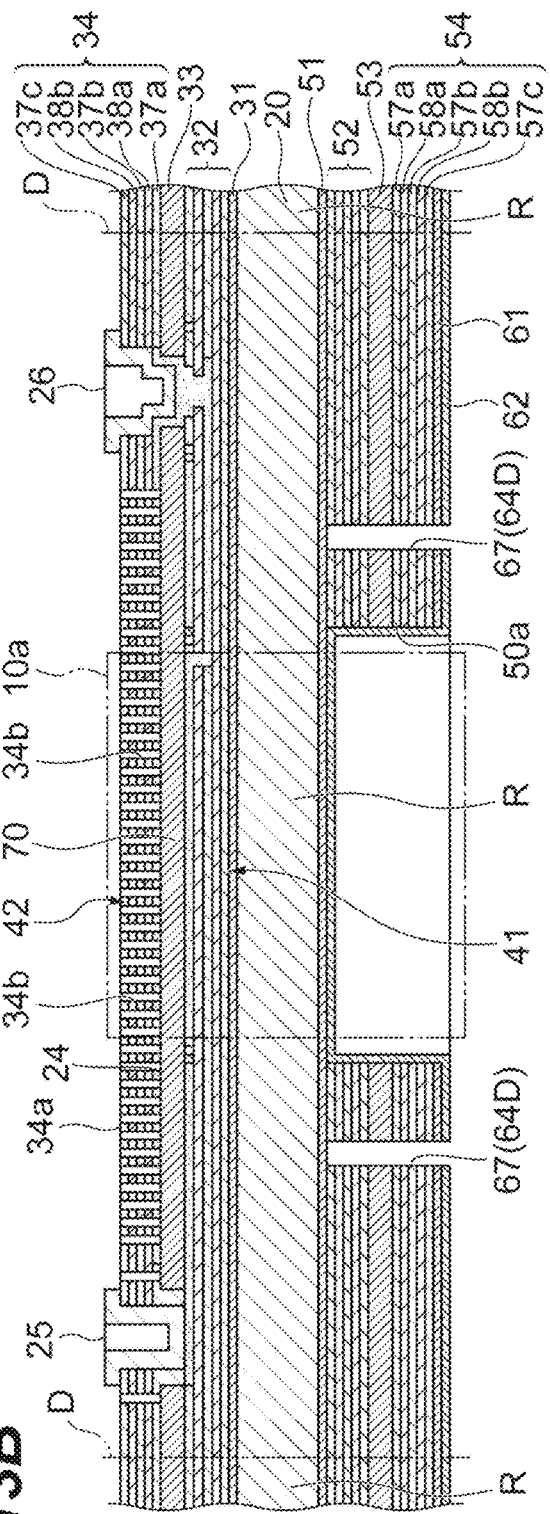

Next, the through-hole 34b reaching from the surface 34a of the second mirror portion 42 to the removal scheduled portion 70 is formed by etching the second laminate 34 partially. Next, the light shielding layer 61 is formed on the fourth laminate 54. Next, the opening 50a is formed in the third laminate 52, the second intermediate layer 53, the fourth laminate 54, and the light shielding layer 61 by the etching. Next, the protection layer 62 is formed on the surface of the light shielding layer 61 and the inner surface of the opening 50a. Next, as illustrated in FIG. 13B, the grooves 67 (separation regions 64D) are formed over the third laminate 52, the second intermediate layer 53, the fourth laminate 54, the light shielding layer 61, and the protection layer 62 by the etching.

Next, as illustrated in FIG. 14A, the removal scheduled portion 70 is removed by performing the etching via the through-hole 34b, so that the air gap S located between the first mirror portion 41 and the second mirror portion 42 is formed for each portion R (a fourth step). In the fourth step, the removal scheduled portion 70 is removed by performing vapor phase etching via the through-hole 34b. In the vapor phase etching, for example, hydrofluoric acid gas is used. In addition, the grooves 67 may be formed after the fourth step.

Next, as illustrated in FIG. 14B, the wafer 20 is cut on the dicing line D and the Fabry-Perot interference filter 10D is obtained (a fifth step). In the fifth step, a modified region is formed in the wafer 20 along the dicing line D by emitting laser light from the side of the first surface 21a, cleavages are extended in a thickness direction of the wafer 20 from the modified region by tape expanding, and the wafer 20 is cut. In addition, the wafer 20 may be cut by other dicing method such as blade dicing.

Figure 15:
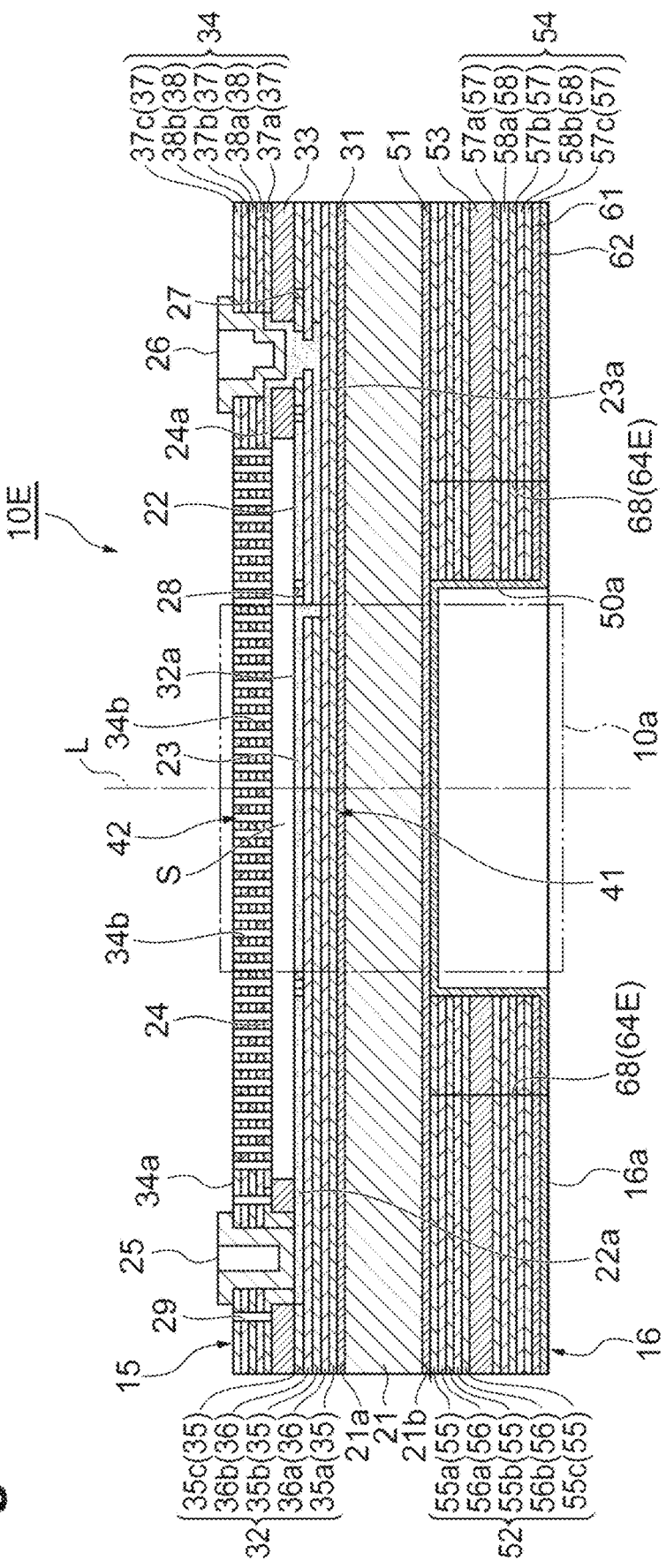
FIG. 15 is a cross-sectional view of a Fabry-Perot interference filter according to a fifth modification.

In addition, the present invention may be configured like a Fabry-Perot interference filter 10E according to a fifth modification illustrated in FIG. 15. Separation regions 64E according to the fifth modification are configured as cracks 68. In the cracks 68, an inner surface of one side and an inner surface of the other side in a direction along the second surface 21b may be separated from each other and may contact each other. For example, in the third step in the manufacturing method according to the fourth modification, the cracks 68 can be formed by performing annealing treatment (heating treatment) on the second layer structure 16.

Similar to the case of the embodiment, even in the fifth modification, a distance between the first mirror portion 41 and the second mirror portion 42 can be controlled with high precision and a superior light transmission characteristic can be obtained. In addition, the cracks 68 may be formed intermittently when viewed from a direction perpendicular to the second surface 21b.

Figure 16A:
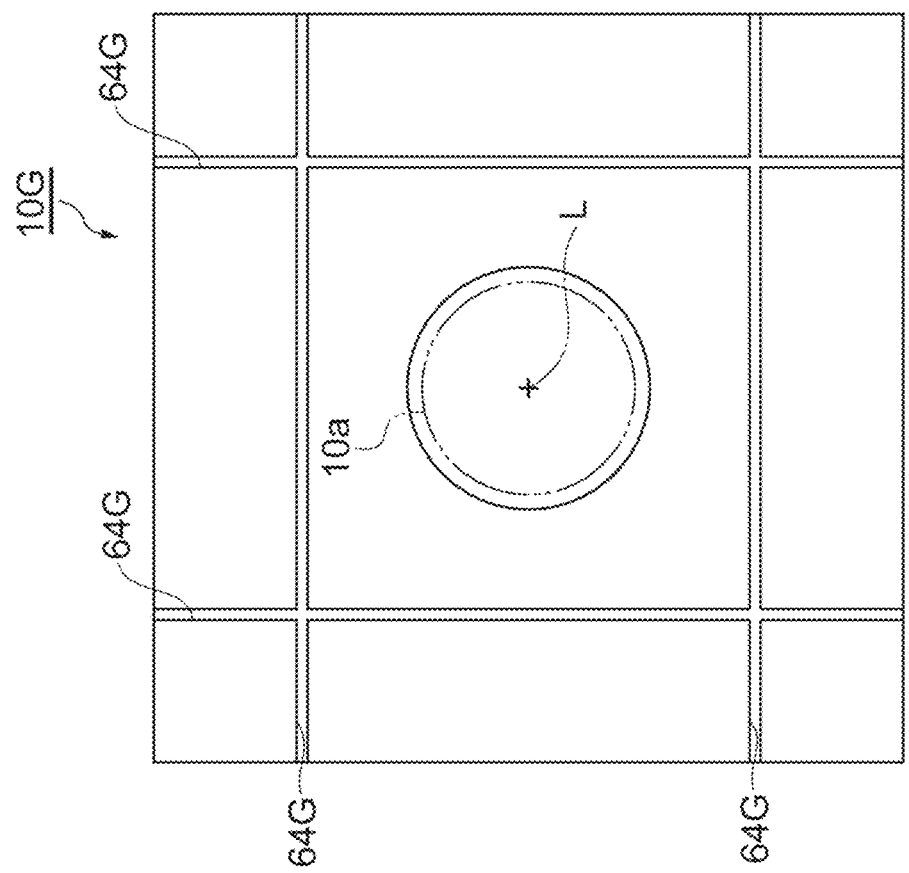
FIG. 16A is a bottom view of a Fabry-Perot interference filter according to a sixth modification and FIG. 16B is a bottom view of a Fabry-Perot interference filter according to a seventh modification.

In addition, the present invention may be configured like a Fabry-Perot interference filter 10F according to a sixth modification illustrated in FIG. 16A. In the sixth modification, one separation region 64F is formed in the second layer structure 16. The separation region 64F extends annularly to surround the light transmission region 10a, when viewed from a direction perpendicular to the second surface 21b. Here, the separation region 64F extends circularly when viewed from the direction perpendicular to the second surface 21b. The separation region 64F separates the second layer structure 16 into one side and the other side (for example, an inner side and an outer side) in a radial direction of the separation region 64F.

Similar to the case of the embodiment, even in the sixth modification, a distance between the first mirror portion 41 and the second mirror portion 42 can be controlled with high precision and a superior light transmission characteristic can be obtained. In addition, in the sixth modification, the separation region 64F extends annularly when viewed from the direction perpendicular to the second surface 21b. As a result, damage such as peeling can be suppressed from occurring in the second layer structure 16. For example, even when cutting wafer including a plurality of portions corresponding to the Fabry-Perot interference filters 10F into the plurality of portions by forming starting points in the wafer and expanding an expanding tape, the cracks are extended with the separation region 64F as the starting point and damage is prevented from occurring in the Fabry-Perot interference filter 10F. Particularly, as in the sixth modification, in the case in which the separation region 64F extends circularly when viewed from the direction perpendicular to the second surface 21b, a balance is improved and the damage such as the peeling can be suitably suppressed from occurring in the second layer structure 16. In addition, in the sixth modification, the separation region 64F extends annularly to surround the light transmission region 10a, when viewed from the direction perpendicular to the second surface 21b. For this reason, when the Fabry-Perot interference filter 10F is fixed on the spacers 9 by means of an adhesive, the adhesive can be suppressed from flowing to the light transmission region 10a. In addition, in the sixth modification, the separation region 64F may extend annularly when viewed from the direction perpendicular to the second surface 21b and may extend in a rectangular annular shape.

Figure 16B:
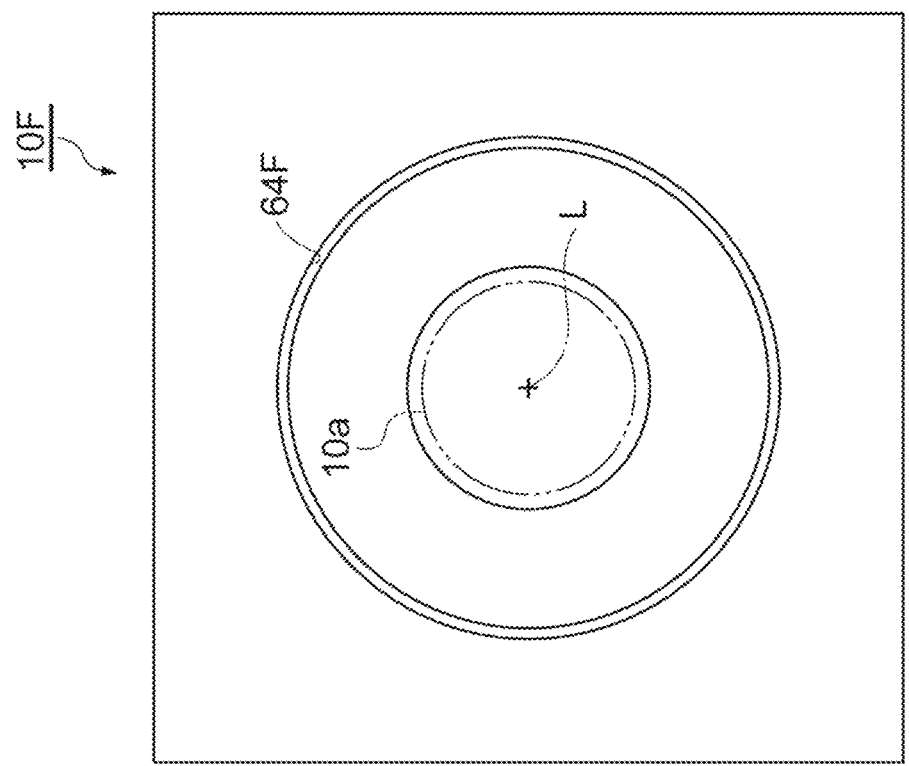

In addition, the present invention may be configured like a Fabry-Perot interference filter 10G according to a seventh modification illustrated in FIG. 16B. In the seventh modification, four separation regions 64G are disposed in a lattice shape to surround the light transmission region 10a, when viewed from a direction perpendicular to the second surface 21b. Among the four separation regions 64G the two separation regions 64G facing each other extend in a direction orthogonal to two sides facing each other in the substrate 21. Among the four separation regions 64G the remaining two separation regions 64G facing each other extend in a direction orthogonal to the remaining two sides facing each other in the substrate 21. Both ends of each separation region 64G reach the sides of the substrate 21.

Similar to the case of the embodiment, even in the seventh modification, a distance between the first mirror portion 41 and the second mirror portion 42 can be controlled with high precision and a superior light transmission characteristic can be obtained. In addition, in the seventh modification, the separation regions 64G are disposed in the lattice shape to surround the light transmission region 10a, when viewed from the direction perpendicular to the second surface 21b. As a result, when the Fabry-Perot interference filter 10G is fixed on the spacers 9 by means of an adhesive, the adhesive can be suppressed from flowing to the light transmission region 10a. Particularly, in the seventh modification, because the ends of each separation region 64G reach the sides of the substrate 21, the adhesive is easy to spread in the separation regions 64G and the adhesive can be effectively suppressed from flowing to the light transmission region 10a.

In the embodiment, the separation region 64 may separate at least a part of the second layer structure 16. For example, the separation region 64 may be formed over the third laminate 52, the second intermediate layer 53, and the fourth laminate 54. In this case, the end of the separation region 64 opposite to the substrate 21 is located inside the fourth laminate 54. In addition, the end of the separation region 64 at the side of the substrate 21 may be located inside the third laminate 52 without reaching the reflection prevention layer 51 and may reach the second surface 21b. The separation region 64 may be formed inside only the second intermediate layer 53, may be formed inside only the third laminate 52, or may be formed inside only the fourth laminate 54. The substrate 21 may have a polygonal plate shape, for example, a pentagonal plate shape.

When the separation region 64 is viewed from the direction perpendicular to the second surface 21b, the separation region 64 may be configured as follows. At least one separation region 64 may be formed and the pair of separation regions 64 may be disposed to be line-symmetrical with respect to the line A. The separation regions 64 may be disposed not to be line-symmetrical with respect to at least one of the line A and the line B. One end of the separation region 64 may reach one side of the substrate 21 and the other end of the separation region 64 may reach the other side of the substrate 21. The end of the separation region 64 may be located inside the substrate 21 without reaching each side of the substrate 21 and the separation region 64 may be formed to pass through the opening 50a. That is, the separation region 64 may be provided in a region including the light transmission region 10a in the second layer structure 16. In this case, the width of the separation region 64 is set to not more than ¼ of the center transmission wavelength, so that an influence on the light transmission characteristic by the separation region 64 can be reduced. The separation regions 64 may cross each other. The separation region 64 may have any shape and may extend in a curved line shape, for example.

According to one aspect of the present invention, a Fabry-Perot interference filter and a light-detecting device in which a superior light transmission characteristic is obtained can be provided.

What is claimed is:

1. A Fabry-Perot interference filter comprising:
a substrate having a first surface and a second surface facing each other;
a first layer structure disposed on the first surface; and
a second layer structure disposed on the second surface,
wherein the first layer structure is provided with a first mirror portion and a second mirror portion facing each other with an air gap therebetween, and a distance between the first mirror portion and the second mirror portion is varied, and
a separation region is formed in the second layer structure, the separation region separating at least a part of the second layer structure into one side and another side in a direction along the second surface,
wherein the separation region separates an area in which the second layer structure is disposed into a plurality of areas when viewed from a direction perpendicular to the second surface.

2. The Fabry-Perot interference filter according to claim 1, wherein
an end of the separation region opposite to the substrate is located inside the second layer structure.

3. The Fabry-Perot interference filter according to claim 2, wherein
the first layer structure has a first laminate disposed on the first surface and including the first mirror portion, a second laminate disposed on the side opposite to the substrate with respect to the first laminate and including the second mirror portion, and a first intermediate layer disposed between the first laminate and the second laminate and defining the air gap,
the second layer structure has a third laminate disposed on the second surface and corresponding to the first laminate, a fourth laminate disposed on the side opposite to the substrate with respect to the third laminate and corresponding to the second laminate, and a second intermediate layer disposed between the third laminate and the fourth laminate and corresponding to the first intermediate layer, and
the separation region is formed over at least both the third laminate and the second intermediate layer.

4. The Fabry-Perot interference filter according to claim 2, wherein
the separation region is configured as a groove.

5. The Fabry-Perot interference filter according to claim 2, wherein
the separation region is configured as a crack.

6. The Fabry-Perot interference filter according to claim 2, wherein
the separation region extends linearly when viewed from a direction perpendicular to the second surface.

7. A light-detecting device comprising:
the Fabry-Perot interference filter according to claim 2;
a light detector detecting light having transmitted the Fabry-Perot interference filter; and
a support portion supporting the Fabry-Perot interference filter from a second layer structure side.

8. The Fabry-Perot interference filter according to claim 1, wherein
the substrate has a polygonal plate shape.

9. The Fabry-Perot interference filter according to claim 8, wherein
the separation region extends in a direction crossing each side of the substrate, when viewed from a direction perpendicular to the second surface.

10. The Fabry-Perot interference filter according to claim 8, wherein
the separation region extends annularly when viewed from a direction perpendicular to the second surface.

11. The Fabry-Perot interference filter according to claim 8, wherein
the first layer structure has a first laminate disposed on the first surface and including the first mirror portion, a second laminate disposed on the side opposite to the substrate with respect to the first laminate and including the second mirror portion, and a first intermediate layer disposed between the first laminate and the second laminate and defining the air gap,
the second layer structure has a third laminate disposed on the second surface and corresponding to the first laminate, a fourth laminate disposed on the side opposite to the substrate with respect to the third laminate and corresponding to the second laminate, and a second intermediate layer disposed between the third laminate and the fourth laminate and corresponding to the first intermediate layer, and
the separation region is formed over at least both the third laminate and the second intermediate layer.

12. The Fabry-Perot interference filter according to claim 8, wherein
the separation region is configured as a groove.

13. The Fabry-Perot interference filter according to claim 8, wherein
the separation region is configured as a crack.

14. The Fabry-Perot interference filter according to claim 8, wherein
an end of the separation region opposite to the substrate reaches a surface of the second layer structure opposite to the substrate.

15. A light-detecting device comprising:
the Fabry-Perot interference filter according to claim 8;
a light detector detecting light having transmitted the Fabry-Perot interference filter; and a support portion supporting the Fabry-Perot interference filter from a second layer structure side.

* * * * *